United States Patent
Kanasugi et al.

(10) Patent No.: US 6,427,108 B1
(45) Date of Patent: Jul. 30, 2002

(54) CONTROL SYSTEM FOR AUTOMATIC VEHICLE TRANSMISSION

(75) Inventors: Katsumi Kanasugi; Satoru Hiraki; Shuji Nagatani, all of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/354,337

(22) Filed: Jul. 16, 1999

(30) Foreign Application Priority Data

Jul. 17, 1998 (JP) .......................... 10-219857
Jul. 17, 1998 (JP) .......................... 10-219858

(51) Int. Cl.⁷ .................. B60K 41/00; F16H 59/66; G06F 7/70
(52) U.S. Cl. .................. 701/51; 701/58; 477/120; 477/118
(58) Field of Search .................. 701/65, 58, 51, 701/70, 96; 477/120, 118, 115, 904, 901, 107

(56) References Cited

U.S. PATENT DOCUMENTS

| | | | | |
|---|---|---|---|---|
| 3,747,438 A | * | 7/1973 | Toyoda et al. | 74/866 |
| 4,598,374 A | * | 7/1986 | Klatt | 364/424.1 |
| 4,625,590 A | | 12/1986 | Miller | 74/866 |
| 4,648,291 A | | 3/1987 | Klatt et al. | 477/119 |
| 4,819,163 A | * | 4/1989 | Shimizu et al. | 364/424.1 |
| 5,231,582 A | | 7/1993 | Takahashi et al. | 364/424 |
| 5,598,336 A | | 1/1997 | Kume et al. | 364/424.08 |
| 5,611,753 A | * | 3/1997 | Kondo et al. | 477/118 |
| 5,655,995 A | * | 8/1997 | Kondo et al. | 477/155 |
| 5,669,847 A | * | 9/1997 | Kashiwabara | 477/46 |
| 5,728,026 A | | 3/1998 | Sakaguchi et al. | 479/110 |
| 5,752,211 A | * | 5/1998 | Takasaki et al. | 701/69 |
| 5,788,005 A | * | 8/1998 | Arai | 180/65.2 |
| 5,832,400 A | * | 11/1998 | Takahashi et al. | 701/53 |
| 5,888,166 A | * | 3/1999 | Minowa et al. | 477/168 |
| 5,895,435 A | * | 4/1999 | Ohta et al. | 701/59 |
| 5,925,087 A | * | 7/1999 | Ohnishi et al. | 701/70 |
| 6,029,107 A | * | 2/2000 | Sato | 701/58 |
| 6,070,118 A | * | 5/2000 | Ohta et al. | 701/65 |

FOREIGN PATENT DOCUMENTS

| | | |
|---|---|---|
| EP | 0698517 A2 | 2/1996 |
| JP | 4-231218 | 8/1992 |
| JP | 6-201523 | 7/1994 |

* cited by examiner

Primary Examiner—Tan Nguyen
Assistant Examiner—Dalena Tran
(74) Attorney, Agent, or Firm—Arent Fox Kintner Plotkin & Kahn, PLLC

(57) ABSTRACT

A control system for an automatic vehicle transmission, in which the running resistance acting on the vehicle and the driving force generated by the vehicle are calculated, and a slope of a road on which the vehicle travels is estimated based on at least the calculated running resistance and the driving force. The vehicle running state is then discriminated by comparing the estimated slope with a predetermined value. The maximum driving force to be generated by the vehicle at the current gear ratio is calculated to determine a driving force difference from the calculated driving force and the gear ratio of the transmission is determined such that the driving force difference is a predetermined value in response to the discriminated running state, thereby enhancing the drivability.

20 Claims, 27 Drawing Sheets

ABSOLUTE VALUE OF ESTIMATED SLOPE (deg)

SPECIFIED VALUE OF DESIRED DRIVING FORCE (kgf)

fmount($\theta$n)

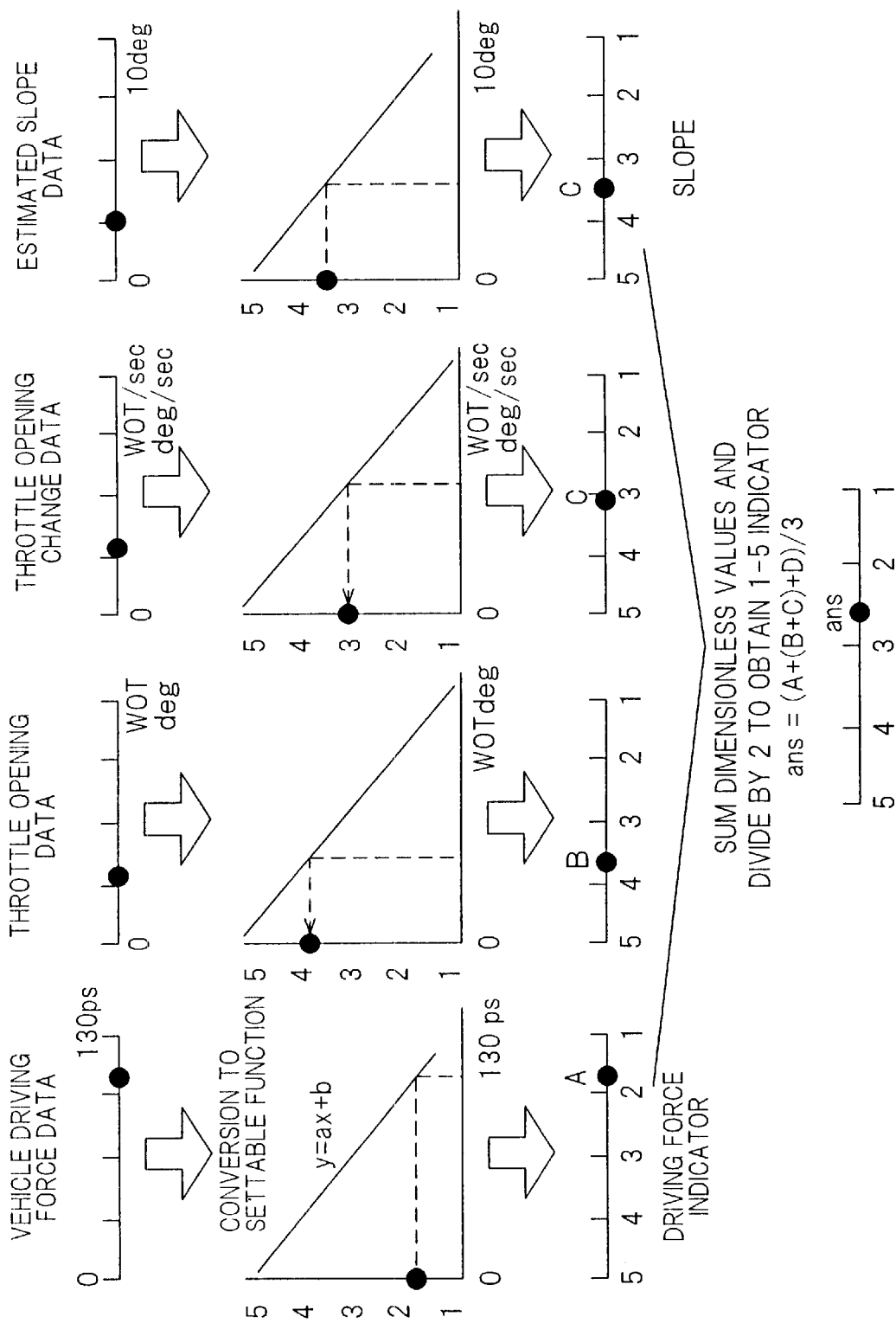

CONTROL SYSTEM FOR AUTOMATIC VEHICLE TRANSMISSION

BACKGROUND OF THE INVENTION

1. Field of the Invention

This invention relates to a control system for an automatic vehicle transmission, more particularly to a control system for an automatic vehicle transmission, that controls the gear ratio (speed ratio) or driving force so as to reflect the intention of the vehicle operator in the vehicle operation as closely as possible.

2. Description of the Prior Art

As taught by Japanese Patent Laid-Open Application No. Hei 4(1992)-231,218, for example, there are known automatic vehicle transmission control systems or driving force control systems that use two types of driving force control methods.

During uphill driving, these conventional technologies effect control with the desired driving force relative to the throttle valve opening divided in regular increments between the maximum driving force and the minimum driving force so as to enhance the impression of acceleration. During downhill driving, they effect control with the integrated value of past deviation (or error) from the desired vehicle acceleration added to the desired acceleration so as to keep acceleration constant.

Specifically, they calculate the output torque of the engine either from the engine speed, throttle valve opening, amount of intake air etc. or by using a torque converter input-output equation, and then use the so-calculated torque value, a differentiated value (signal) of the vehicle speed signal and the level running resistance torque to calculate the slope of the road on which the vehicle travels.

However, the conventional technologies do not take into account the slope or other such running conditions and environmental factors. Since they therefore do not reflect driving force change produced by change in running resistance in the case of a slope or the like, they cannot vary the driving force in response to the running state.

Although they are intended to enhance acceleration feel during uphill driving, they cannot produce a specified driving force. Specifically, since they effect control for keeping the desired acceleration constant while correcting for deviation from the desired driving force during past driving, they continue to apply the past correction value even when a change occurs in the slope during downhill driving. The driving force therefore does not necessarily remain constant when the slope changes.

While the prior art control technologies may be able to maintain the acceleration constant, since the control cancels out deviation owing to difference in vehicle weight and the like, it is affected by the past integrated value and therefore cannot keep the integrated value in proper correspondence with the change in slope. This is a cause for unstable control.

Aside from the above, in Japanese Patent Laid-Open Application No. Hei 6(1994)-201,523, it is proposed to estimate the slope of road without using a sensor. In the prior art, specifically, the output torque of the engine is calculated in a similar manner using at least one of the engine speed, the throttle opening and the amount of intake air, etc., and the road slope is estimated based on the calculated output torque, the differentiated value of vehicle speed and the level running resistance such that the gear ratio is controlled based on the estimated road slope.

However, it is difficult in the prior art to estimate the road slope accurately, while avoiding the lag of estimation. As a result, the prior art is disadvantageous in that it would not be able to attain the expected result when conducting the gear ratio control using the estimated road slope.

SUMMARY OF THE INVENTION

This invention is directed to overcoming the foregoing drawbacks. One object of the invention is to provide a control system for an automatic vehicle transmission that, focusing on the fact that the quality of drivability varies markedly during hill climbing and descent, estimates the slope, discriminates climbing, descending and other driving states, and controls the gear ratio (speed ratio) in response to the discrimination so as to achieve the desired driving force and enhance drivability.

Another object of the invention is to provide a control system for an automatic vehicle transmission that calculates an evaluation indicator signifying drivability tendency and controls the gear ratio (speed ratio) in response to the calculated evaluation indicator, thereby enhancing drivability.

Still another object of the invention is to provide a control system for an automatic vehicle transmission that estimates the road slope accurately, without estimation lag, and controls the gear ratio (speed ratio) optimally, thereby enhancing drivability.

In order to achieves these objects, according to the first aspect of this invention, there is provided a system for controlling an automatic transmission of a vehicle having an input shaft connected to an internal combustion engine mounted on the vehicle and an output shaft connected to driven wheels of the vehicle, the transmission transmitting output torque generated by the engine and inputted through the input shaft to the driven wheels through the output shaft, wherein the improvement comprises: operating condition detecting means for detecting operating conditions of the engine and the vehicle including at least a vehicle speed and a throttle opening; running resistance calculating means for calculating a running resistance acting on the vehicle;driving force calculating means for calculating a driving force generated by the vehicle; slope estimating means for estimating a slope of a road on which the vehicle travels based on at least the calculated running resistance and the driving force; running state discriminating means for comparing the estimated slope with a predetermined value and for discriminating a running state of the vehicle; gear ratio determining means for calculating a maximum driving force to be generated by the vehicle at a current gear ratio to calculate a driving force difference from the calculated driving force and for determining a gear ratio such that the driving force difference is a predetermined value in response to the discriminated running state; and transmission operating means for operating the transmission in response to the determined gear ratio.

In order to achieves these objects, according to the second aspect of this invention, there is provided a system for controlling an automatic transmission of a vehicle having an input shaft connected to an internal combustion engine mounted on the vehicle and an output shaft connected to driven wheels of the vehicle, the transmission transmitting output torque generated by the engine and inputted through the input shaft to the driven wheels through the output shaft, wherein the improvement comprises:operating condition detecting means for detecting operating conditions of the engine and the vehicle including at least a vehicle speed and a throttle opening; actual driving force calculating means for calculating an actual driving force generated by the vehicle based on at least the detected throttle opening; operator desired estimating means for estimating an operator desire estimated value desired by a vehicle operator based on at least the detected throttle opening; indicator conversion means for converting the actual driving force and the operator desire estimated value to an evaluation indictor; running characteristic discriminating means for discriminating based on the evaluation indicator which of a first running characteristic and a second running characteristic, which are different in driving force response, the vehicle operator wants; and driving force controlling means for controlling a driving force of the vehicle through at least one of an output of the engine and a gear ratio in accordance with the discriminated running characteristic.

BRIEF EXPLANATION OF THE DRAWINGS

This and other objects and advantages of the invention will be more apparent from the following description and drawings, in which:

FIG. 29 is a diagram, similar to that of FIG. 11, showing another example of the processing in the flow chart of FIG. 2 for indicator conversion and averaging.

DETAILED DESCRIPTION OF THE PREFERRED EMBODIMENTS

Figure 1:
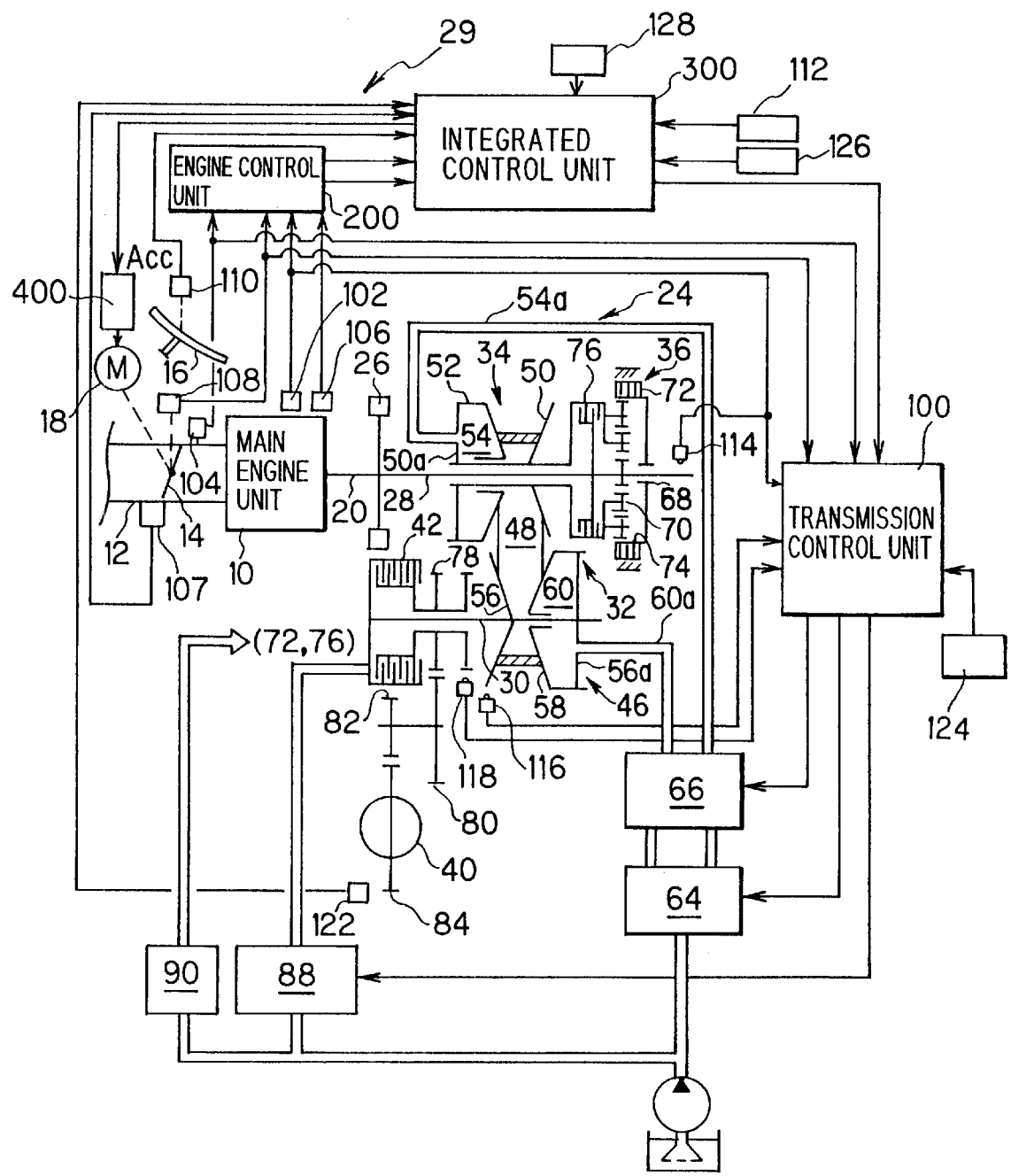
FIG. 1 is an overall schematic view of a control system for an automatic vehicle transmission according to the invention.

FIG. 1 is an overall schematic view of a control system for an automatic vehicle transmission according to the invention. The automatic transmission in the illustrated embodiment is a belt-drive continuously variable transmission (CVT).

Reference numeral 10 in this figure designates an internal combustion engine, more precisely the main unit of the engine. This unit is referred to both as the "engine" and as the "engine main unit" in the following description. A throttle valve 14 is installed in an air intake pipe 12 connected to the engine 10. The throttle valve 14 is operated by an accelerator pedal 16 located on the floor of the vehicle near the operator's seat (not shown), not by direct mechanical connection but indirectly by the output of a stepper motor 18 connected therewith.

The output shaft (crankshaft) 20 of the engine (main unit) 10 is connected to a continuously variable transmission (CVT) 24.

Specifically, the output shaft 20 of the engine (main unit) 10 is connected through a dual-mass flywheel 26 to an input shaft 28 of the transmission 24. The engine (main unit) 10 and the transmission 24 are installed in a vehicle represented solely by the reference numeral 29.

The transmission 24 comprises a metal V-belt mechanism 32 located between the input shaft 28 and a countershaft 30, a planetary gear-type forward/reverse switching mechanism 36 located between the input shaft 28 and a drive-side movable pulley 34, and a start clutch 42 located between the countershaft 30 and a differential 40. Driving power transmitted to the differential 40 is transmitted to left and right driven wheels (not shown) through a drive shaft (not shown).

The metal V-belt mechanism 32 comprises the drive-side movable pulley 34 mounted on the input shaft 28, a driven-side movable pulley 46 mounted on the countershaft 30, and a metal V-belt 48 wound about the two pulleys. The drive-side movable pulley 34 comprises a fixed pulley half 50 mounted on the input shaft 28 and a movable pulley half 52 movable relative to the fixed pulley half 50 in the axial direction.

On the side of the movable pulley half 52 is formed a drive-side cylinder chamber 54 enclosed by a cylinder wall 50a connected to the fixed pulley half 50. Oil pressure supplied to the drive-side cylinder chamber 54 through an oil line 54a produces lateral pressure for moving the movable pulley half 52 in the axial direction.

The driven-side movable pulley 46 comprises a fixed pulley half 56 mounted on the countershaft 30 and a movable pulley half 58 movable relative to the fixed pulley half 56 in the axial direction. On the side of the movable pulley half 58 is formed a driven-side cylinder chamber 60 enclosed by a cylinder wall 56a connected to the fixed pulley half 56. Oil pressure supplied to the driven-side cylinder chamber 60 through an oil line 60a produces lateral pressure for moving the movable pulley half 58 in the axial direction.

A regulator valve group 64 is provided for determining pulley control oil pressure supplied to the drive-side cylinder chamber 54 and the driven-side cylinder chamber 60, and a speed-ratio control valve group 66 is provided for supplying the pulley control oil pressure to the cylinder chambers 54 and 60. These set appropriate lateral pulley pressures at which no V-belt 48 slip occurs and vary the pulley width of the pulleys 34, 46 to vary the radius of the V-belt 48 wound about the pulleys 34, 46, thereby continuously varying the speed ratio.

The planetary gear-type forward/reverse switching mechanism 36 comprises a sun gear 68 connected to the input shaft 28, a carrier 70 connected to the fixed pulley half 50, a ring gear 74 that can be immobilized by a reverse brake 72, and a forward clutch 76 that can connect the sun gear 68 and the carrier 70.

When the forward clutch 76 engages, all gears rotate unitarily with the input shaft 28 to drive the drive-side movable pulley 34 in the same direction (forward) as the input shaft 28. When the reverse brake 72 engages, the ring gear 74 is immobilized so that the carrier 70 is driven reversely from the sun gear 68 and the drive-side movable pulley 34 is driven in the opposite direction (reverse) from the input shaft 28. When both the forward clutch 76 and the reverse brake 72 disengage, the transmission of power through the forward/reverse switching mechanism 36 is cut off and no power is transmitted between the engine 10 and the drive-side pulley 34.

The start clutch 42 is for ON/OFF (engage/disengage) control of power transmission between the countershaft 30 and the differential 40. When the start clutch 42 is ON (engaged), the engine output varied in speed ratio by the metal V-belt mechanism 32 is transmitted through gears 78, 80, 82 and 84 to the differential 40, which divides and transmits it to the left and right driven wheels (not shown). When the start clutch 42 is OFF (disengaged), the transmission assumes a neutral state.

The operation of the start clutch 42 is controlled by a clutch control valve 88, and the operation of the reverse brake 72 and the forward clutch 76 of the forward/reverse switching mechanism 36 is controlled by a manual shift valve 90 in response to the operation of a manual shift lever (not shown).

The valve groups are controlled based on control signals from a transmission control unit 100 comprising of a microcomputer.

For this, a crank angle sensor 102 provided at an appropriate location in the engine main unit 10, such as near the cam shaft (not shown), outputs a signal proportional to the crank angle (which is counted and used to calculate the engine speed Ne). A manifold absolute pressure sensor 104 installed in the air intake pipe 12 at an appropriate location downstream of the throttle valve 14 outputs a signal proportional to the manifold absolute pressure PBA in the air intake pipe (the engine load).

A coolant temperature sensor 106 provided at an appropriate location on the cylinder block (not shown) outputs a signal proportional to the engine coolant temperature TW. An intake air temperature sensor 107 provided an appropriate location on the air intake pipe 12 outputs a signal proportional to the intake air temperature (approximately equal to the outside air temperature).

A throttle position sensor 108 installed near the throttle valve 14 outputs a signal proportional to the throttle opening θ th and an accelerator position sensor 110 provided near the accelerator pedal 16 outputs a signal proportional to the accelerator position ACC to which the vehicle operator has depressed the accelerator pedal 16.

A brake switch 112 provided near the brake pedal or the brake system (neither shown) outputs a brake ON signal in response to an operator braking operation.

In the transmission 24, a speed sensor 114 provided near the input shaft 28 outputs a signal proportional to the rotational speed NDR of the input shaft 28, a speed sensor 116 provided near the driven-side movable pulley 46 outputs a signal proportional to the rotational speed of the driven-side movable pulley 46, i.e., the rotational speed NDN of the input shaft of the start clutch 42 (the countershaft 30), and a speed sensor 118 provided near the gear 78 outputs a signal proportional to the rotational speed of the gear 78, i.e., the rotational speed NOUT of the output shaft of the start clutch 42.

A vehicle speed sensor 122 provided near the drive shaft (not shown) connected to the differential 40 outputs a signal proportional to the vehicle speed V. A shift lever position switch 124 provided in the vicinity of the shift lever (not shown) installed on the vehicle floor near the operator's seat outputs a signal proportional to one among from the various gear range positions (D, N, P . . . ) selected by the vehicle operator.

An accelerometer 126 provided near the middle of the vehicle 29 outputs a signal proportional to the lateral acceleration G acting perpendicularly to the advancing direction of the vehicle 29. A steer angle sensor 128 provided near the steering wheel (not shown) installed at the operator's seat (not shown) outputs a signal corresponding to the steer angle.

In addition to having the transmission control unit 100 mentioned earlier, the system is also equipped with an engine control unit 200 which comprises of a microcomputer. The outputs of the crank angle sensor 102, the manifold absolute pressure sensor 104, the coolant temperature sensor 106 and the throttle position sensor 108 are forwarded to both of the control units 100 and 200.

The system is also equipped with an integrated control unit 300 which comprises of a microcomputer. The outputs of the accelerator position sensor 110, the vehicle speed sensor 122 etc. are sent to the integrated control unit 300.

The integrated control unit 300 determines the desired gear ratio (speed ratio), i.e., the desired value of the rotational speed NDR, and sends it to the transmission control unit 100.

The transmission control unit 100 drives the movable pulleys 34, 46 to control the speed ratio and obtain the desired NDR. The desired NDR is the desired rotational speed of the drive-side movable pulley 34 of the transmission 24 and the gear ratio (speed ratio; hereinafter called simply "ratio") is solely determined and controlled by defining the desired NDR relative to the vehicle speed V.

Since, as explained in the foregoing, this embodiment is equipped with the transmission 24 capable of continuously controlling the ratio, it can, as explained in the following, enhance drivability by effecting control to optimize the ratio for the running state.

The integrated control unit 300 also determines the desired throttle opening and sends it to a throttle control unit 400. The throttle control unit 400 drives the throttle valve 14 via the stepper motor 18 to set the throttle opening to the decided value.

The operation of the control system for an automatic vehicle transmission according to this invention will now be explained.

Figure 2:
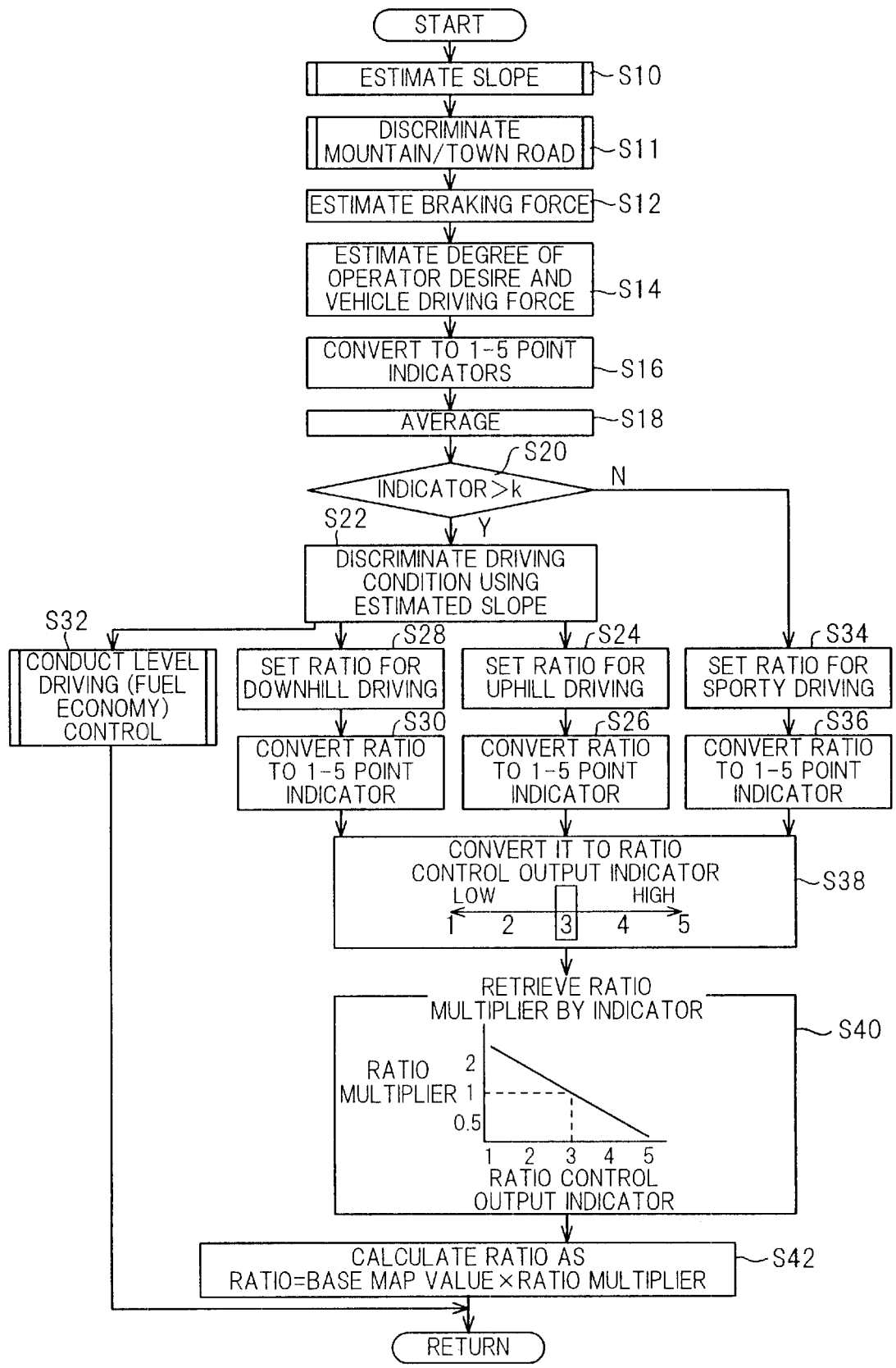
FIG. 2 is a flow chart showing the operation of the system shown in FIG. 1.

FIG. 2 is a flow chart showing the operation of the control system for automatic vehicle transmission according to the present invention. Before going into an explanation based on this figure, the operation of the control system will first be explained in general terms with reference to FIG. 3.

As pointed out earlier, this system focuses on the fact that the quality of drivability varies markedly during hill climbing and descent. Vehicle running results were analyzed especially for mountain roads and the factors affecting drivability were analyzed in terms of physical quantity (driving force). In this invention the so-ascertained relationship between drivability and physical quantity is expressed as an evaluation indicator and the ratio (or driving force) is controlled based on the evaluation indicator.

Figure 3:
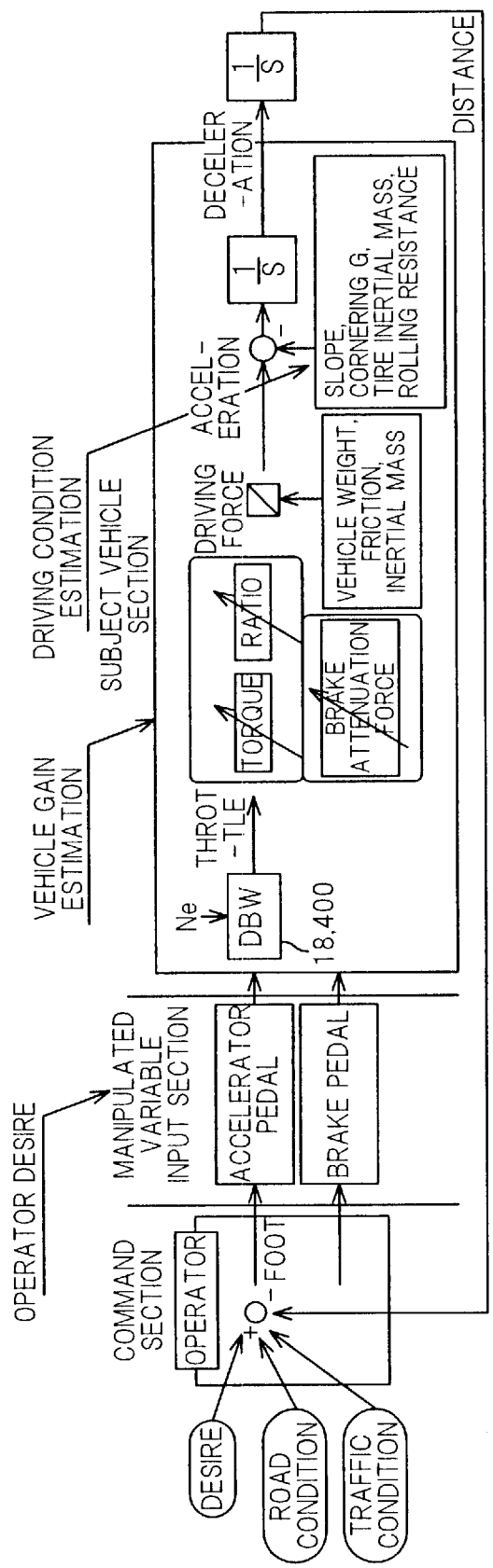
FIG. 3 is a block diagram for explaining a physical quantity state estimation model predicated on the operation shown in the flow chart of FIG. 2.

Specifically, the physical quantity state estimation model shown in FIG. 3 is used to analyze correlation with drivability. More particularly, in a manipulated variable input section, the degree of operator desire is estimated based on the position of the accelerator pedal operated by the vehicle operator and expressed as an indicator. A model for this is shown in FIG. 4.

Figure 4:
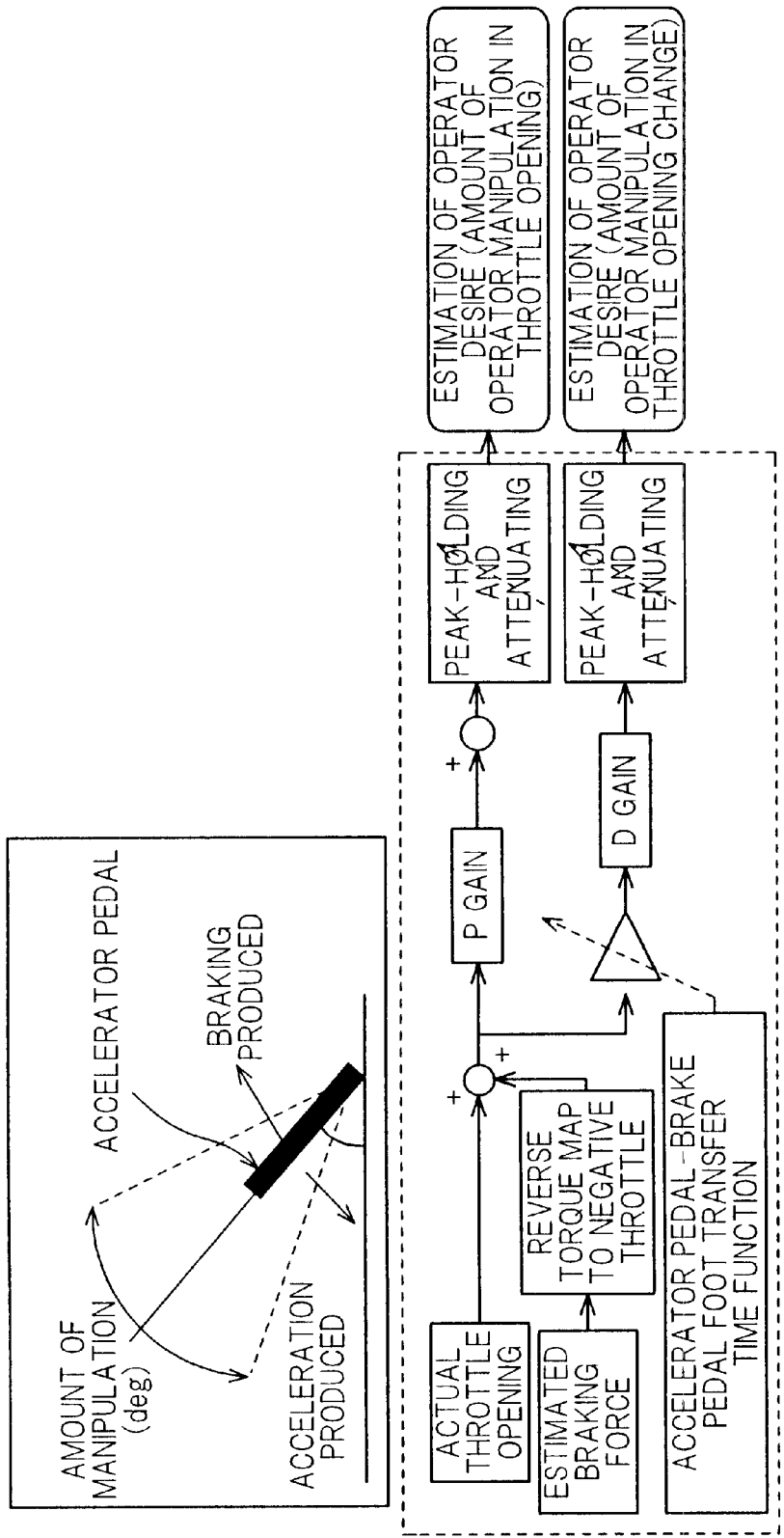
FIG. 4 is a block diagram showing the processing in the block diagram of FIG. 3 for calculating operator desire.
Figure 5:
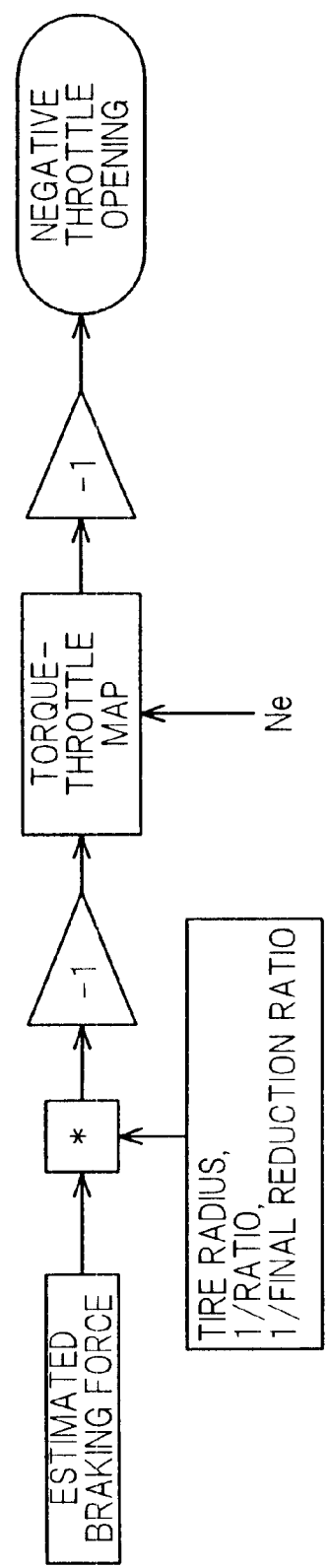
FIG. 5 is a block diagram showing the processing in the block diagram of FIG. 4 for calculating a negative throttle valve opening value from the estimated braking force.
Figure 6:
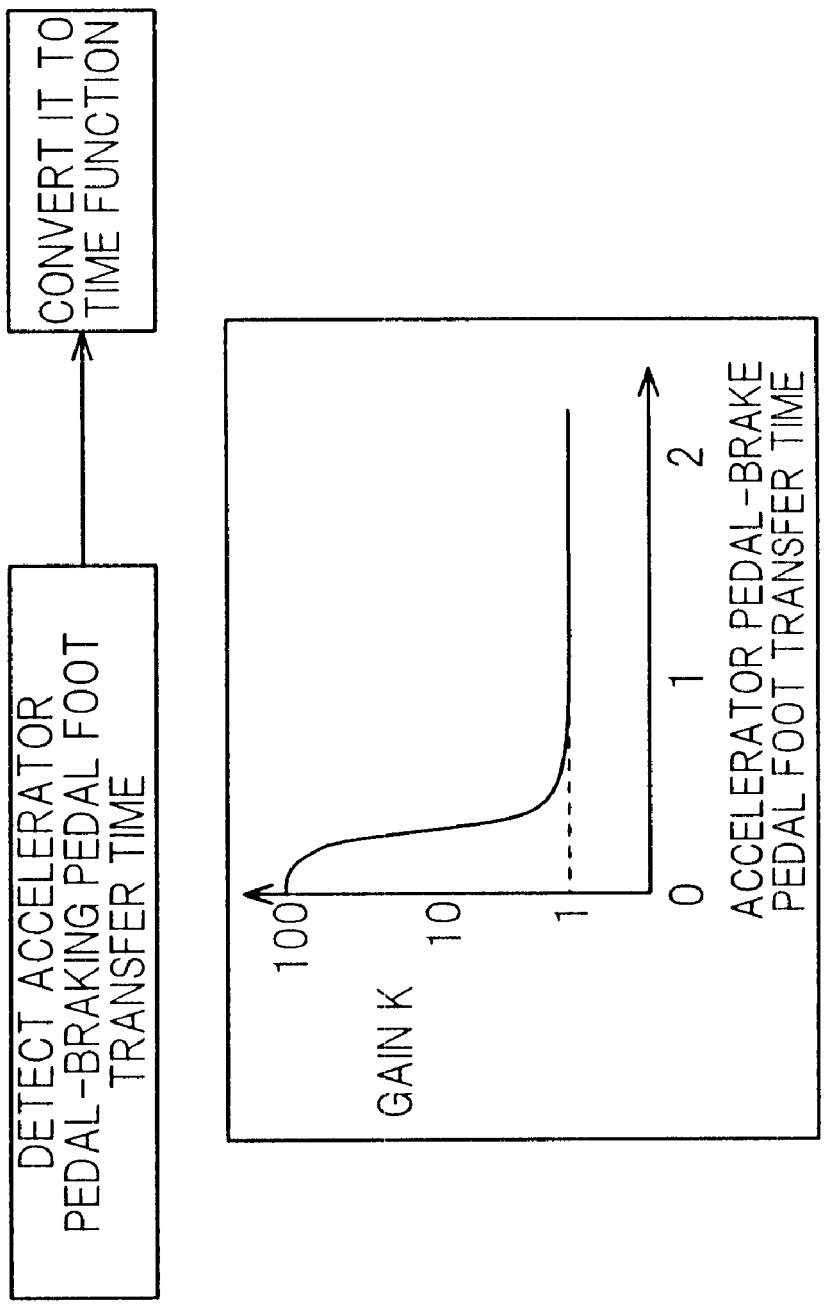
FIG. 6 is a block diagram showing the processing in the block diagram of FIG. 4 for calculating an accelerator pedal-brake pedal foot transfer time function.

One feature of the model shown in FIG. 4 is that the accelerator pedal position and the brake pedal depression are viewed on the same plane, i.e., the model assumes release of the accelerator pedal to be a braking operation. Specifically, as shown in FIG. 5, driving force (torque) is viewed as load value based on the estimated braking force (explained later). As shown in FIG. 6, the gain is regulated based on the accelerator pedal-brake pedal foot transfer time. This will be explained later.

Figure 7:
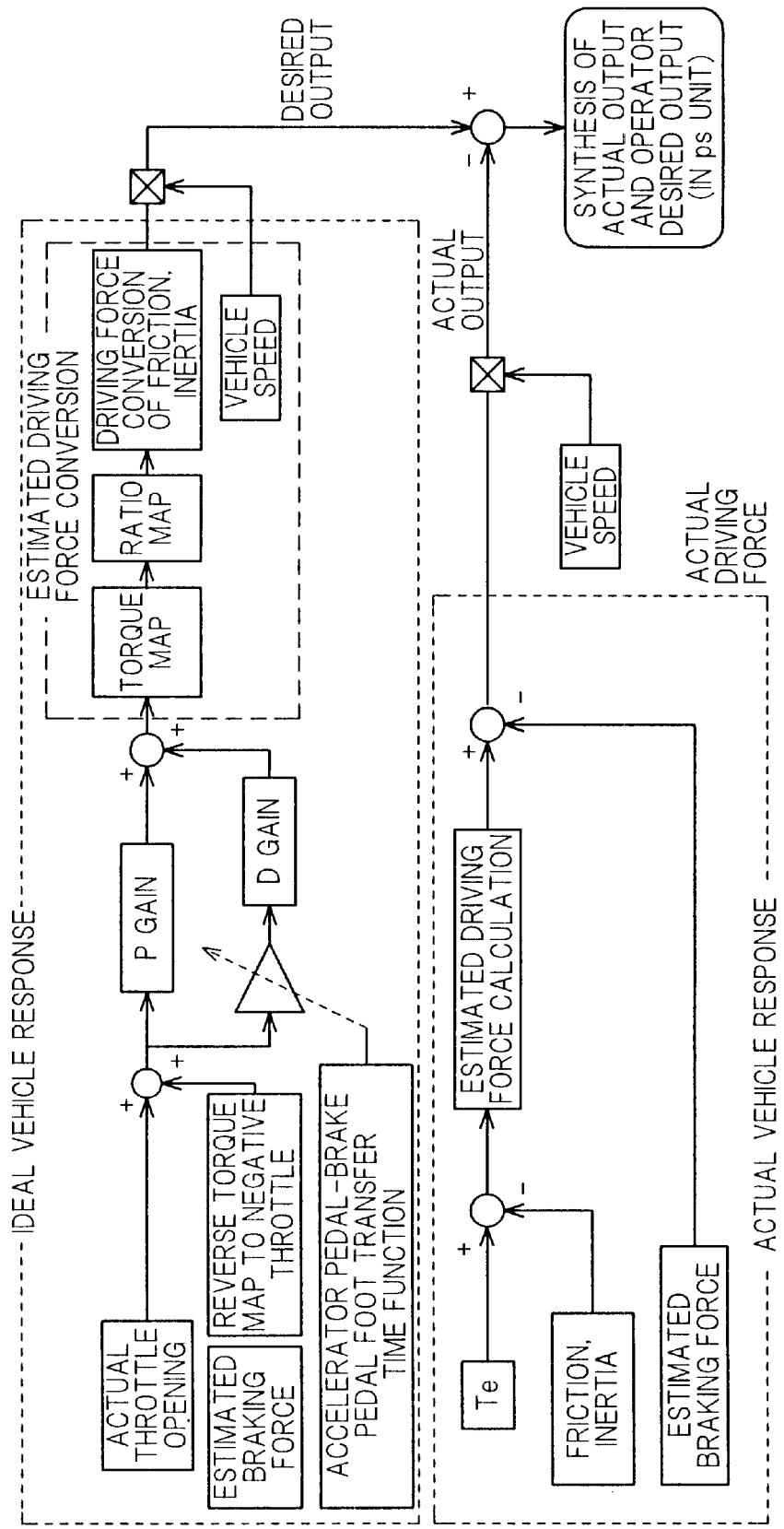
FIG. 7 is a block diagram showing the processing in the block diagram of FIG. 3 for calculating vehicle gain.

The vehicle gain is estimated in the subject vehicle section of the model shown in FIG. 3. Specifically, as shown in FIG. 7, a model created to represent the difference between the ideal vehicle response and the actual vehicle response (the actual response of the subject vehicle 29) is used to synthesize the actual output and the operator's desired output. More specifically, the difference is calculated and the vehicle response (driving force) estimated. This will also be explained later.

Next the indicators obtained from the model illustrated in FIG. 4 and the model illustrated in FIG. 7 are averaged and compared with a prescribed value to discriminate whether the operator wants sporty driving (running) characteristics or relaxed driving (running) characteristics. By sporty driving (running) characteristics is meant high response of driving force change to accelerator pedal position. By relaxed driving (running) characteristics is meant low response of driving force to accelerator pedal position as compared with the sporty driving (running) characteristics, i.e., characteristics that lower the degree of operator involvement.

When it is discriminated that the operator wants relaxed driving characteristics, the driving condition is discriminated based on the slope estimated from the vehicle speed and the like, i.e., it is discriminated whether the vehicle is running uphill, downhill or level, and the ratio is controlled to bring the driving force to the desired value. When it is discriminated that the operator wants sporty driving characteristics, the ratio is controlled to bring the driving force to the desired value by controlling the ratio to obtain higher driving force response than in the case of the relaxed driving characteristics.

Specifically, a ratio control output indicator is calculated to obtain a ratio coefficient (ratio multiplier) and a base (ratio) ratio map value is multiplied thereby to decide the ratio.

Based on this background, the operation of the control system will now be explained with reference to the flow chart of FIG. 2. The illustrated program is executed by the integrated control unit 300 at prescribed intervals, e.g., once every 0.1 sec.

Figure 8:
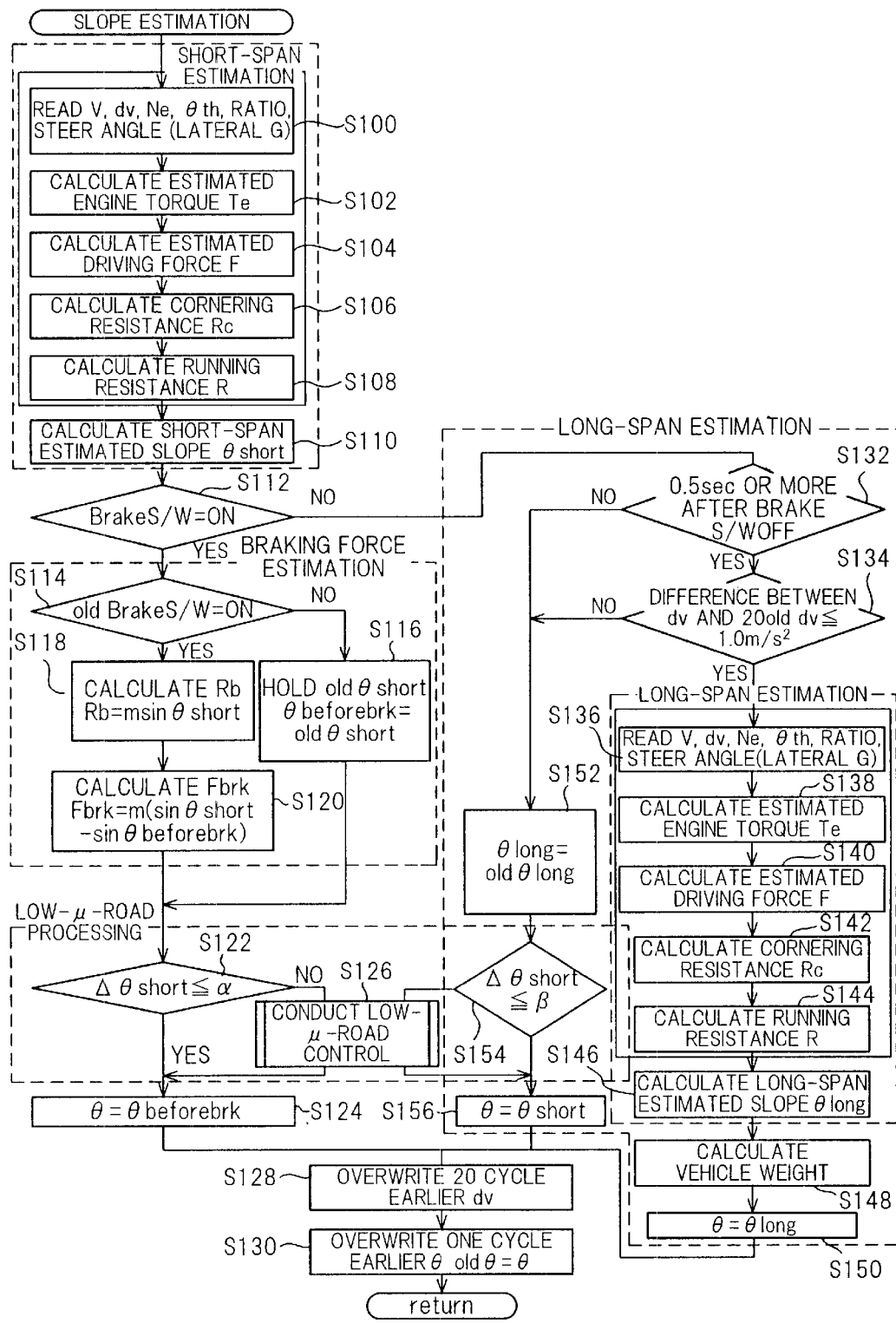
FIG. 8 is a subroutine flow chart showing the processing in the flow chart of FIG. 2 for slope estimation.

First in S10, the slope θ, i.e., the slope θ of the road on which the vehicle is traveling, is estimated (calculated). FIG. 8 is a subroutine flow chart of the processing of S10.

As mentioned earlier, in the control according to this embodiment, the slope of the road traveled is calculated (estimated) so as to enable discrimination of the driving condition or running state. This is done either by "long-span slope estimation" or by "short-span slope estimation." Long-span slope estimation is carried out over a long period with emphasis on precision and produces a "long-span estimated slope." Short-span slope estimation is carried out in a short period with emphasis on response and produces a "short-span estimated slope."

More specifically, two types of prescribed detection conditions, methods, detection timings and filterings are used in the slope estimation. In other words, the slope estimation is conducted using different filter time constants. One of the estimated slopes is selected in light of the vehicle running state, the driving environment is discriminated, and the ratio controlled.

In the flow chart of FIG. 8, the processing for calculating the short-span estimated slope is carried out in S100 to S110. In S100, the detected vehicle speed V, acceleration dv (vehicle acceleration; first order difference value or differential value of the vehicle speed V), throttle opening θ th, ratio (NDR) and the steering angle (lateral acceleration G) are read.

Figure 9:
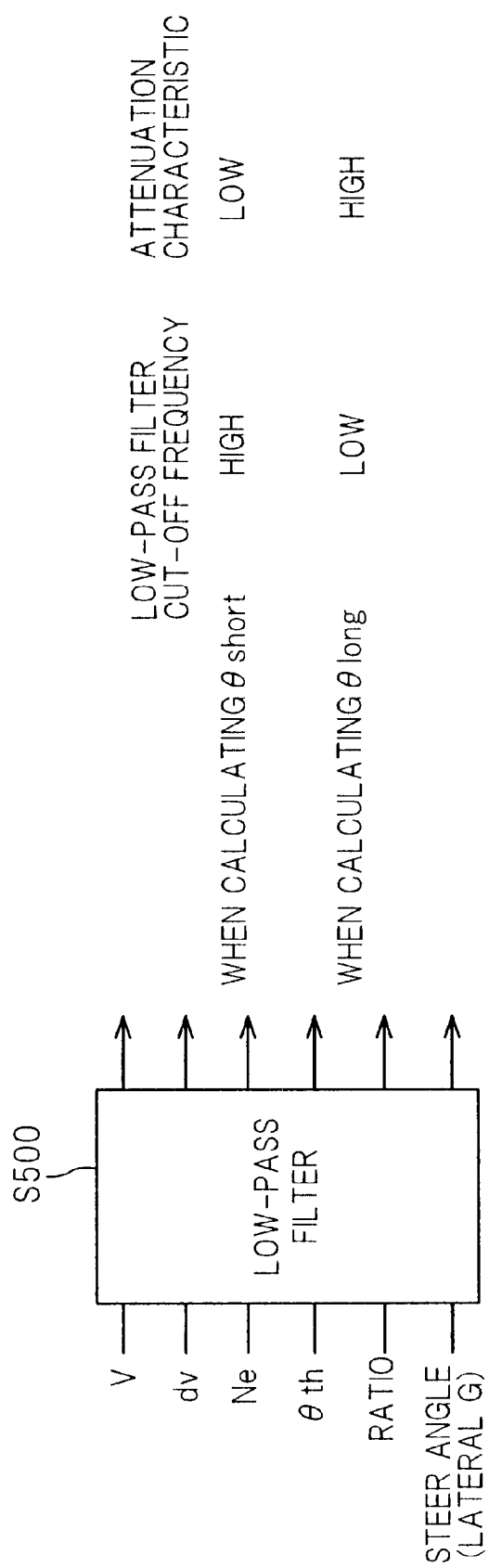
FIG. 9 is a block diagram for explaining the filter characteristics used in the processing for reading sensor outputs in the flow chart of FIG. 8.

FIG. 9 is a diagram for explaining the processing of S100. As shown, the processing is conducted by use of a low-pass filter 500. Specifically, at the time the detected values are read they are filter-processed through the low-pass filter 500.

More specifically, during short-span slope estimation, the cut-off frequency of the low-pass filter 500 is set high and the attenuation characteristic is set low to raise the response. During long-span slope estimation, the cut-off frequency is set low and the attenuation characteristic is set high, i.e., the accuracy is increased by eliminating high-frequency components that include a lot of disturbance components attributable to acceleration/deceleration etc.

In S100, since it is in the short-span slope estimation, the sensor output values are read from the filter with its cut-off frequency set high and attenuation characteristic set low.

Next, in S102, the torque Te being output by the engine (main unit) 10 is calculated (estimated) from the detected throttle opening θth using an appropriatelycompiledthrottleopening-torqueconversiontable(not shown).

Next, in S104, the driving force F being output or generated by the vehicle 29 is calculated (estimated). The following equation is used for the calculation:

$$F=(1/r)\times[(Te-Tf)\times ratio\times k-dNe/dt\cdot C][kgf]tm \quad Eq.\ 1$$

where r: tire radius, Tf: torque loss due to total transmission friction, k: final reduction ratio, C: inertial mass component.

Figure 10:
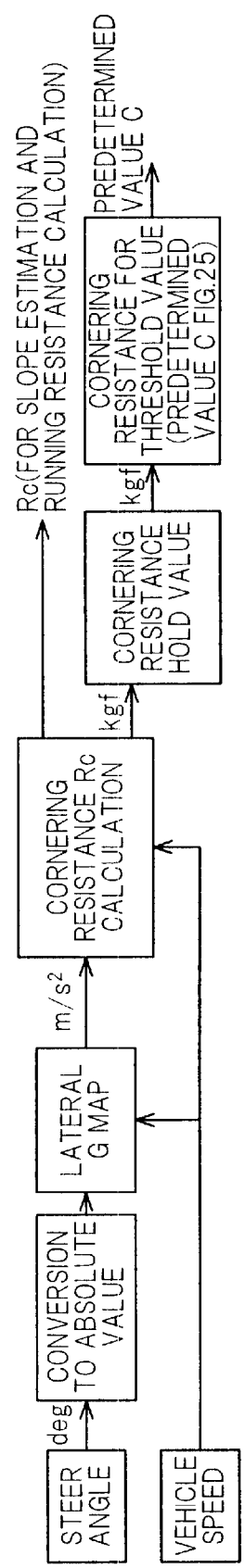
FIG. 10 is a block diagram showing the processing in the flow chart of FIG. 8 for calculating cornering resistance.

Then, in S106, the cornering resistance Rc is calculated. By cornering resistance Rc is meant the decelerating force produced by tire deformation (turning force) during cornering. FIG. 10 is a block diagram for explaining the cornering resistance calculation.

The input value of the steer angle is converted to an absolute value, and this absolute value and the detected vehicle speed are used as address data to retrieve the lateral acceleration G (acceleration acting in the lateral direction of the vehicle) from a lateral G map (not shown). Next, the calculated lateral G and the detected vehicle speed are used as address data to retrieve the cornering resistance Rc from an appropriately created map (not shown).

The accuracy of the running resistance R calculated (estimated) as explained later can be enhanced by addition of the cornering resistance Rc obtained here. A cornering resistance hold value is calculated for use in the mountain/town road discrimination explained later.

Returning to the explanation of the flow chart of FIG. 8, next, in S108 of FIG. 8, the running resistance R is calculated (estimated). Specifically, it is calculated using the cornering resistance Rc obtained in the foregoing manner, the detected parameter values (vehicle speed V, acceleration dv), values stored in memory beforehand (vehicle weight, coefficient of air resistance, coefficient of rolling resistance) and the like, as follows:

$$R=\rho CdAV^2+ma+m\sin\theta+\mu m\cos\theta+Rc\ [kgf]tm \quad Eq.\ 2$$

where

ρ: coefficient of air density, Cd: coefficient of air drag, A: total projected area of vehicle, θ: slope, μ: coefficient of rolling resistance, m: vehicle weight, a: acceleration, Rc: cornering resistance.

Next, in S110, sin θ is calculated from Equations 1 and 2, as follows:

$$\sin\theta=[F-\{\rho CdAV^2-ma+\mu m\cos\theta+Rc\}]/m\ [°] \quad Eq.\ 3.$$

The obtained value is defined as short-span estimated slope θ short. Sin θ is used as slope θ because it would be difficult for the microcomputer to calculate slope θ within the control cycle of 0.1 sec, and such a calculation is in fact unnecessary. The inventors have found the short-span estimated slope value calculated in this manner to be accurate to within ±5°.

Next, in S112, it is checked whether the ON signal is being output by the brake switch 112, i.e., it is checked whether the operator is operating the brake system (not shown).

When the result in S112 is YES, it is checked in S114 whether braking was also being effected during the preceding control cycle (program cycle). When the result is NO, the program goes to S116, in which the value of the short-span estimated slope in the preceding cycle, oldθ short, is held as the slope value before braking, θ beforebrk.

When the result in S114 is YES, the program goes to S118, in which the product of the short-span estimated slope value and the vehicle weight m is defined as the slope-specific resistance Rb (or slope-specific driving force) during braking (during brake operation), and then to S120, in which the braking force Fbrk is calculated (estimated) by the equation set out in the drawing.

In other words, if the road slope is assumed to be constant before and after turn-on of the brake switch 112, the braking force can be determined as the deviation between the slope-specific driving force immediately before brake switch 112 turn-on and the slope-specific driving force during braking.

At the time of entering S120, the estimated slope value before braking θ beforebrk is being held because it was found that the brake pedal was also being depressed in the preceding cycle. In the processing of S120, this held value is used to calculate the slope-specific resistance before braking msinθ beforebrk, whereafter the calculated value is subtracted from the slope-specific resistance during braking msinθ short calculated in S118 to determine the braking force Fbrk.

Next, in S122, it is checked whether the difference Δθ short between the value during braking θ short (obtained in S116) and the estimated slope value in the preceding cycle oldθ is equal to or smaller than an appropriately defined threshold value α. By this check it can be determined whether the vehicle has spun or slipped, because in such a case the estimated slope θ short takes an abnormally large negative value. In S122, it is judged that spin or slip occurred when the difference Δθ short between the short-span estimated slope value θ short and the estimated slope value in the preceding cycle oldθ is greater than the threshold value α.

When the result in S122 is YES, it can be assumed that the vehicle is running on an ordinary road. The program therefore goes to S124, in which the estimated slope θ is set to the estimated slope value before braking θ beforebrk.

When the result in S122 is NO, it can be assumed that slip or spin occurred because the vehicle is running on a bad road with low traction. The program therefore goes to S126, in which control for roads including low-μ-road control processing is conducted. This will be explained later.

After the estimated slope value θ has been set to the held estimated slope value before braking θ beforebrk in S124, the program goes to S128, in which 20 olddv is overwritten with the value of dv (indicative of acceleration) 20 cycles earlier, and to S130, in which oldθ is overwritten with the estimated slope value θ. This concludes the current cycle.

When the result in S112 is NO, i.e., when it is found that braking operation is not currently being conducted, the program goes to S132, in which it is checked whether 0.5 sec or more has elapsed since the brake switch 112 turned off.

When the result in S132 is YES, the program goes to S134, in which, as shown, it is checked whether the difference (in the absolute value) between the current acceleration dv and the acceleration 20 sec earlier, 20 olddv, is equal to or smaller than 1.0[m/sec$^2$].

When the result in S134 is YES, it can be assumed that the vehicle is running normally with little speed change. Next, in S136, the long-span estimated slope θ long is calculated. In other words, the long-span estimated slope is calculated only when the vehicle is running normally with acceleration fluctuation at less than a prescribed value.

The processing for calculating the long-span estimated slope is carried out in S136 to S146. In S136, the detected vehicle speed V, acceleration dv, throttle opening θ th, ratio, and the steer angle (lateral acceleration G) are read.

As was explained with reference to FIG. 9, filtered sensor output values are read from the filter 500, whose cut-off frequency is set low and attenuation characteristic is set high. The processing in steps S138 to S144 is similar to that in the processing for calculating the short-span estimated slope and will not be explained again here. The value obtained in S146 is defined as estimated slope θ long. The inventors have found the short-span estimated slope value calculated in this manner to be accurate with an error of not more than 2%.

As explained further later, one or the other of the short-span estimated slope and the long-span estimated slope is used according to purpose.

Next, in S148, the vehicle weight is calculated (estimated) by an appropriate method. Although the vehicle weight is stored in memory beforehand, the stored value is corrected to enhance its accuracy when the vehicle is running stably.

Next, in S150, the estimated slope value θ is set to the long-span estimated slope value θ long obtained in S146, whereafter the program goes to S128.

When the result in S132 is NO, i.e., when it is found that the prescribed time period of 0.5 sec has not passed since brake switch turn-off, or when the result in S134 is NO, the program goes to S152, in which the long-span estimated slope value θ long is set to the long-span estimated slope value in the preceding cycle old θ long.

Next, in S154, it is checked whether the difference Δθ short between the short-span estimated slope value e short calculated in S110 and the estimated slope value in the preceding cycle oldθ is equal to or smaller than a threshold value β. Similarly to what was explained regarding S122, it is judged that spin or slip occurred when the difference Δθ short between the short-span estimated slope value θ short and the estimated slope value in the preceding cycle oldθ is greater than the threshold value β.

When the result in S154 is YES, it judged that the vehicle is running normally and the program goes to S156, in which the estimated slope value θ is set to the estimated slope value before braking θ short. When the result in S154 is NO, it can be assumed that the vehicle is running on a bad road. The program therefore goes to S126, in which the control on roads including low-μ-road control processing is conducted.

Next, in S11 of the flow chart of FIG. 2, mountain/town road discrimination is conducted. This will be explained later.

Next, in S12, the braking force Fbrk is estimated.

When the driving force F immediately before braking and the driving force F during braking are calculated, the following is obtained. (Values of the driving force F etc. immediately before braking are suffixed with 0 and those during braking are suffixed with 1.)

The driving force immediately before braking is calculated using the following equation:

$$F0 = \rho CdAV0^2 + ma0 + m \sin \theta 0 + \mu m \cos \theta 0 + Fbrk0 + Rc0 [kgf].$$

The driving force during braking is calculated using the following equation:

$$F1 = \rho CdAV1^2 + ma1 + m \sin \theta 1 + \mu m \cos \theta 1 + Fbrk(1) + Rc1 [kgf].$$

It follows from the hypothesis that:
m sin θ0=m sin θ1
Rc0=Rc1=0
μm cos θ0=μm cos θ1.

The braking force Fbrk can therefore be obtained as:

$$Fbrk = Fbrk1 - Fbrk0 \qquad \text{Eq. 4}$$

$$= F1 - F0 - \rho CdAV1^2 - \rho CdAV0^2 - m(a1 - a0) - Rc1 - Rc0$$

Next, in S14, the estimation of degree of operator desire mentioned earlier is conducted. The operator desire is indicated by the throttle valve opening and the amount of throttle opening change.

This will be explained with reference to FIG. 4. The aforesaid estimated braking force Fbrk is converted to a negative throttle valve opening value by retrieval from a reverse torque map and the converted value is subtracted from the detected throttle opening. Specifically, as shown in FIG. 5, the estimated braking force is converted to driving force around the vehicle axle, the result is used to retrieve a throttle valve opening value from a map with characteristics opposite from those of the map used earlier to determine torque Te, and the retrieved value is converted to a negative value.

In other words a model is created for this control wherein, as shown at the upper part of FIG. 4, the accelerator pedal position and the brake pedal depression are viewed on the same plane and braking is equated with return of the accelerator pedal beyond the wide-open position.

Next, the difference obtained is multiplied by P (proportional) gain, the obtained value is subjected to peak-holding and time-course attenuating, and the result is defined as operator desire (expressed as throttle opening (θ th)). Similarly, the difference obtained (not shown) is multiplied by D (differential) gain, the obtained value is subjected to peak-holding and time-course attenuating, and the result is defined as degree of operator desire (expressed as amount of throttle opening change dth; more specifically, indicating amount of throttle opening change).

The accelerator depression speed or foot transfer time indicates the intensity of the operator's desire. The D gain is therefore used to weight the differential value of the accelerator pedal position as a technique for reflecting this fact in the model. As shown in FIG. 6, the D gain is varied as a function of the determined accelerator pedal-to-brake pedal transfer time.

Simultaneously, the vehicle driving force (of the subject vehicle 29, corresponding to the aforesaid vehicle gain) is estimated.

This will be explained with reference to FIG. 7. At the top of this drawing is shown a model depicting the ideal response of the vehicle (first model) and at the bottom is shown a model depicting the actual response of the vehicle (second model). The first model determines the driving force by the same arithmetic operations as shown in FIG. 4, multiplies the result by the detected vehicle speed and defines the product as the output desired by the operator.

The second model calculates the estimated driving force from the aforesaid engine torque Te, subtracts the estimated braking force from the result, similarly multiplies the difference by the detected vehicle speed and defines the product as the output actually being produced by the vehicle (actual output). The actual output is subtracted from the desired output in an adder/subtracter stage and the difference is defined as the divergence output (or difference output). This divergence output indicates how much divergence is present between the degree of operator desire and the actual output.

Figure 11:
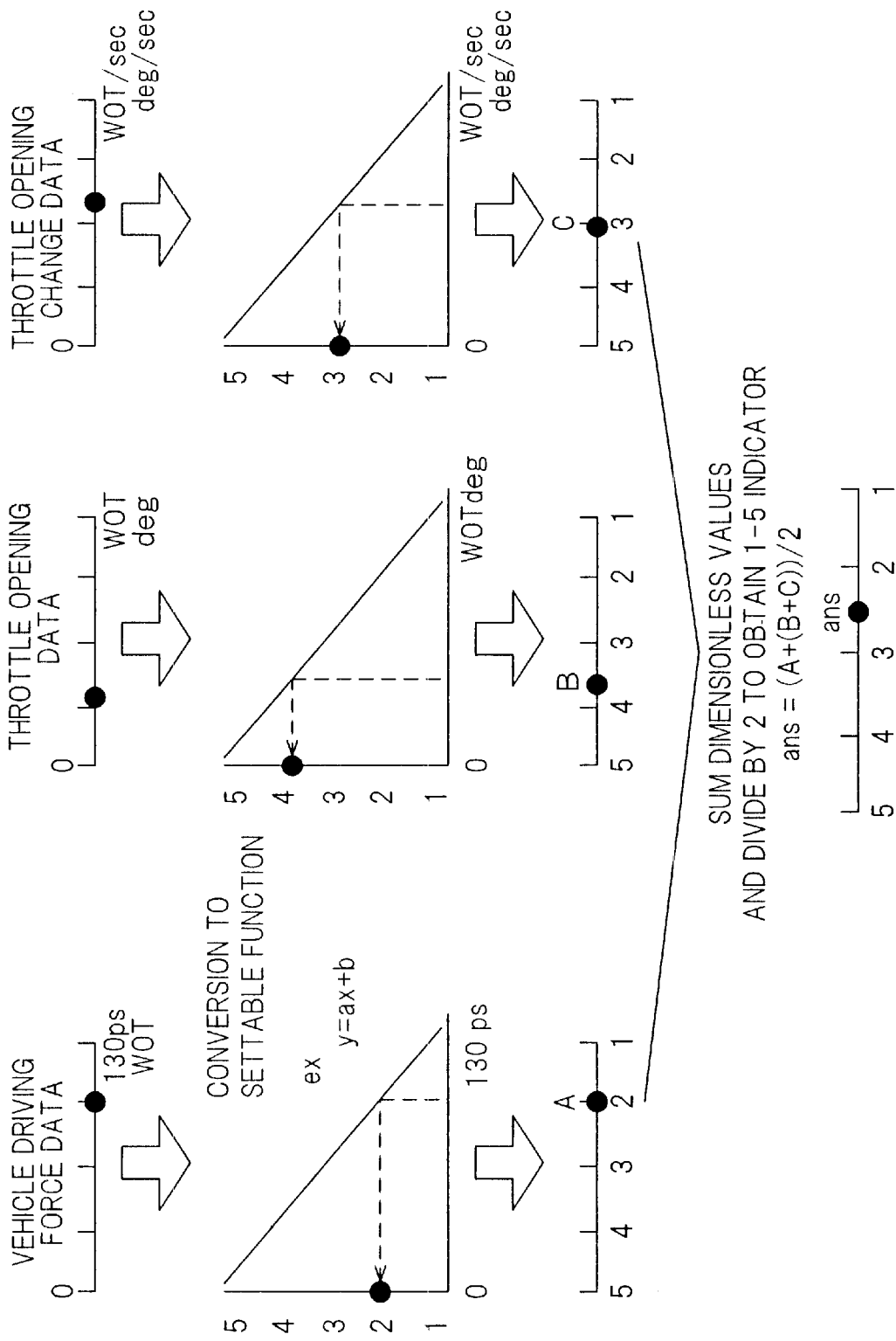
FIG. 11 is a diagram showing the processing in the flow chart of FIG. 2 for indicator conversion and averaging.

Next, in S16 of the flow chart of FIG. 2, the values obtained in S14 are converted into indicators on a scale of 1 to 5 points. The indicators are then synthesized (averaged) in S18. The processing for this will be explained with reference to FIG. 11. Specifically, an appropriate function (a first-order function is shown in the drawing) is used for conversion to dimensionless numerical values of 1 to 5 points (conversion to dimensionless values) and the calculated values are used to retrieve a corresponding evaluation indicator.

By this there can be created an evaluation indicator that reflects the operator desire (desire for relaxed driving or sporty driving) in an indicator based on the performance of the vehicle engine. Although averaging is used as the synthesis method here, other methods, such as selection of the maximum value or the minimum value, can also be adopted. Moreover, the averaging is not limited simple averaging but can instead be weighted averaging or the like.

The reason for synthesizing the indicators of the estimated operator desire value and the estimated vehicle driving force value is that there are cases, such as during cruising on an expressway, when the throttle opening and the change therein are small but the driving force is large. As this is also highly sporty driving, the judgment of whether or not the operator desires sporty driving cannot be made solely from the throttle opening and change therein but must also take the estimated vehicle driving force into account.

Next, in S20, it is checked whether the indicator obtained exceeds a prescribed value k. The obtained indicator is thus used to ascertain whether the operator wants relaxed driving or sporty driving and control suitable for the type of driving desired is conducted.

Since an affirmative result in S20 means the operator wants relaxed driving, the program goes to S22 in which the driving condition is discriminated using the estimated road slope $\theta$. This is conducted by comparing the slope $\theta$ with the aforesaid prescribed values $\alpha$ and $\beta$.

When the slope $\theta$ is found to be greater than $\alpha$ in S22, it is judged that the vehicle is running uphill and the program goes to S24, in which the ratio is set based on the instantaneous reserve drive force.

Figure 12:
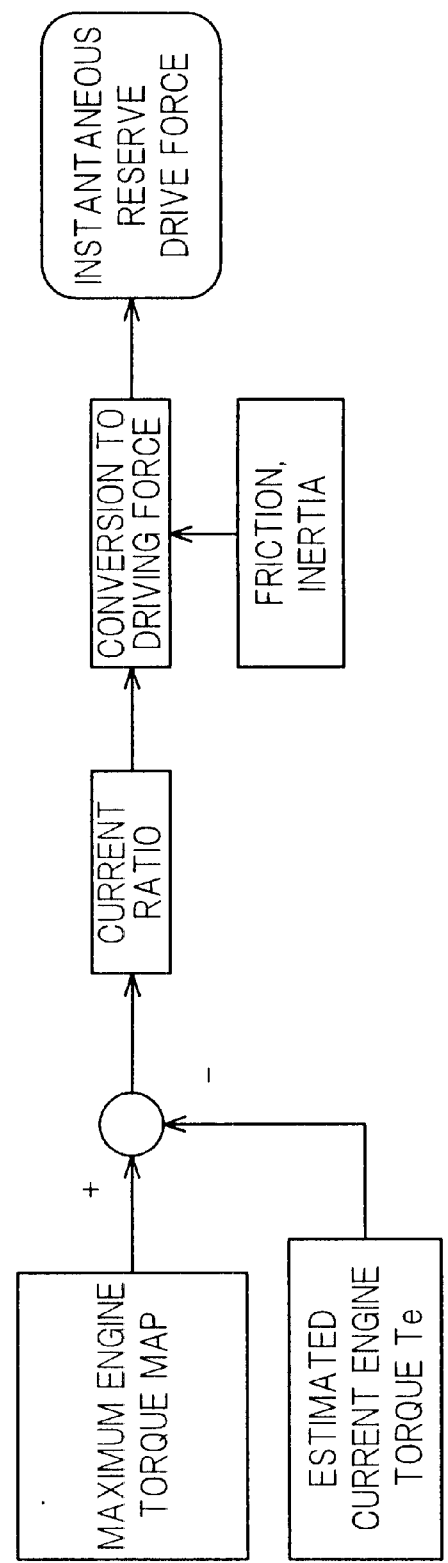
FIG. 12 is a block diagram for explaining the processing in the flow chart of FIG. 2 for calculating an instantaneous reserve drive force value used in uphill driving control.

This will be explained with reference to FIG. 12. "Instantaneous reserve drive force" is a term coined by the inventors. It refers to the difference between the wide-open output (the output at Wide-Open Throttle) that would be produced if the accelerator pedal should be fully depressed (or depressed a prescribed amount) at the current ratio and engine speed and the actual engine torque the engine is actually outputting at the current ratio and engine speed. As such, it is a parameter indicating the vehicle reserve or the state of driving force change with respect to accelerator pedal position (accelerator response). This is a different concept from "reserve power" (difference between wide-open output and running resistance) as generally defined.

Figure 13:
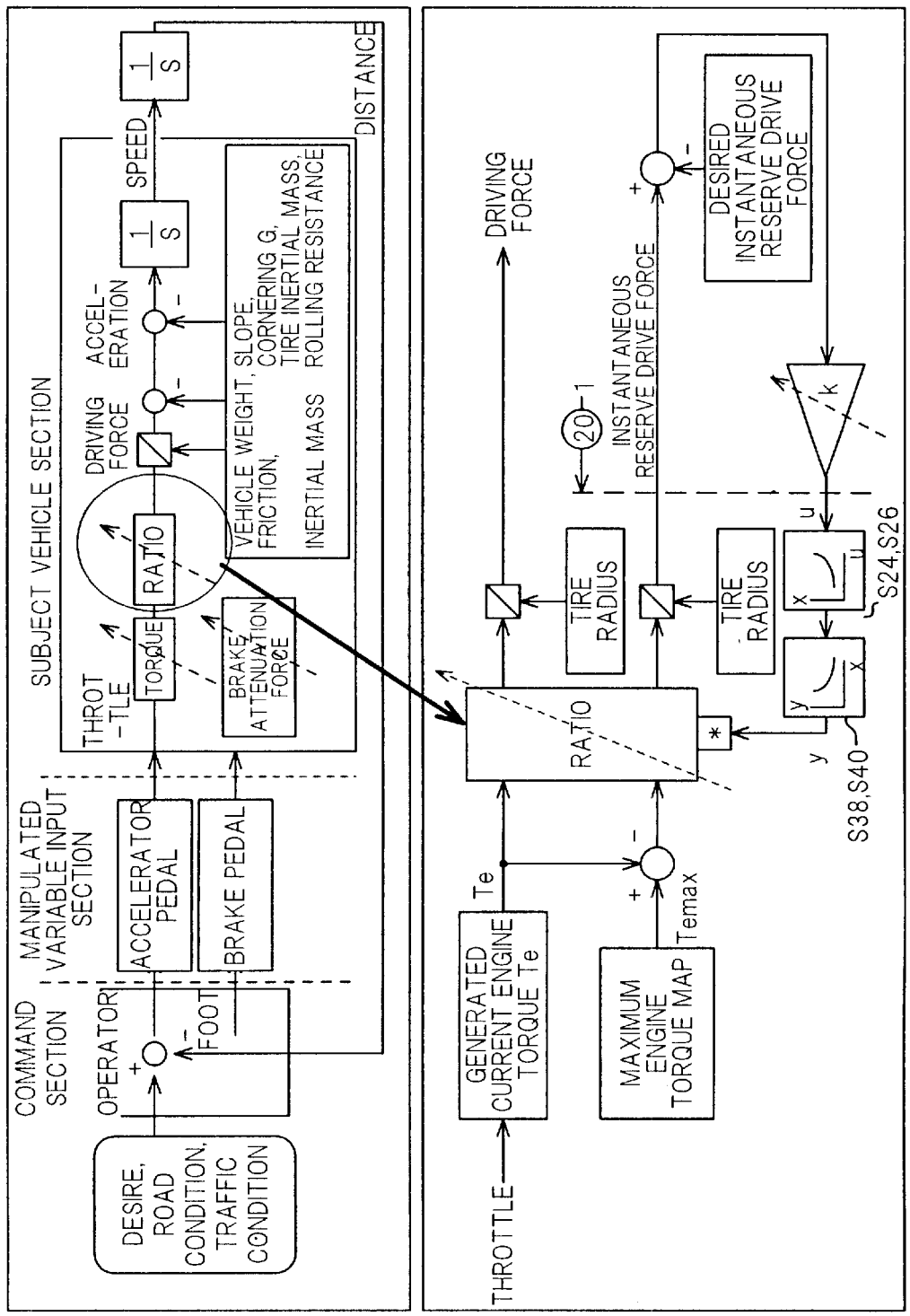
FIG. 13 is a block diagram for explaining the uphill driving control of the flow chart of FIG. 2.

FIG. 13 shows the control effected when the operator wants relaxed driving and the vehicle has been judged to be running uphill. The model shown at the top of the drawing is used to set the ratio so as to bring the instantaneous reserve drive force at the bottom of the drawing to the desired instantaneous reserve drive force.

Tests conducted by the inventors showed that a desired instantaneous reserve drive force of a maximum acceleration of around 0.1 G, of around 50 to 100 kgf when the vehicle weight is about 1 [t], is suitable for relaxed uphill driving.

Figure 14:
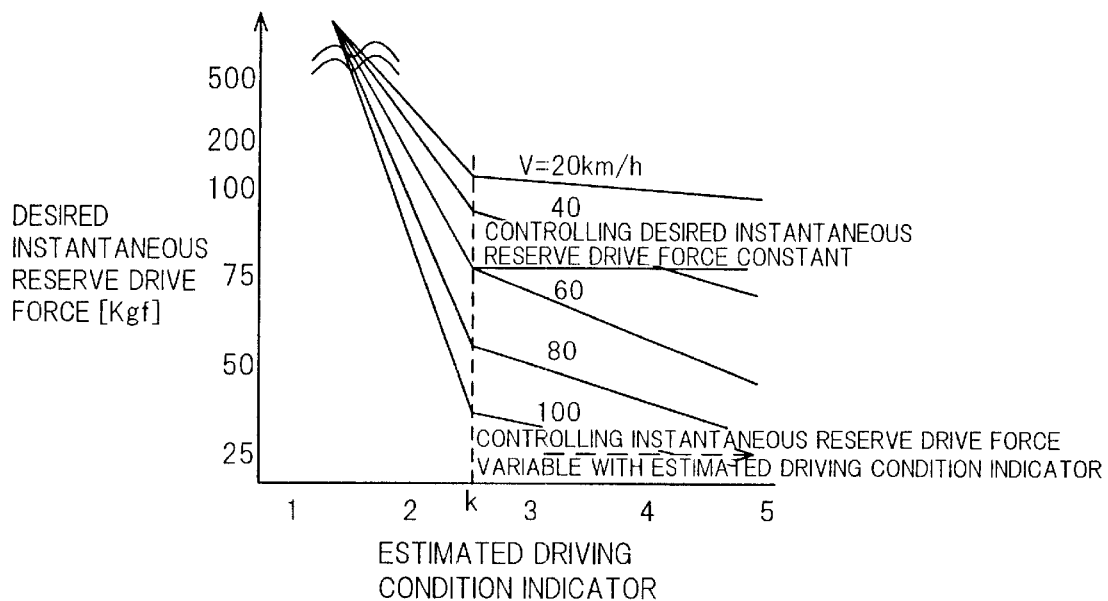
FIG. 14 is a graph for explaining instantaneous reserve drive force characteristics used in the uphill driving control of the flow chart of FIG. 2.
Figure 15:
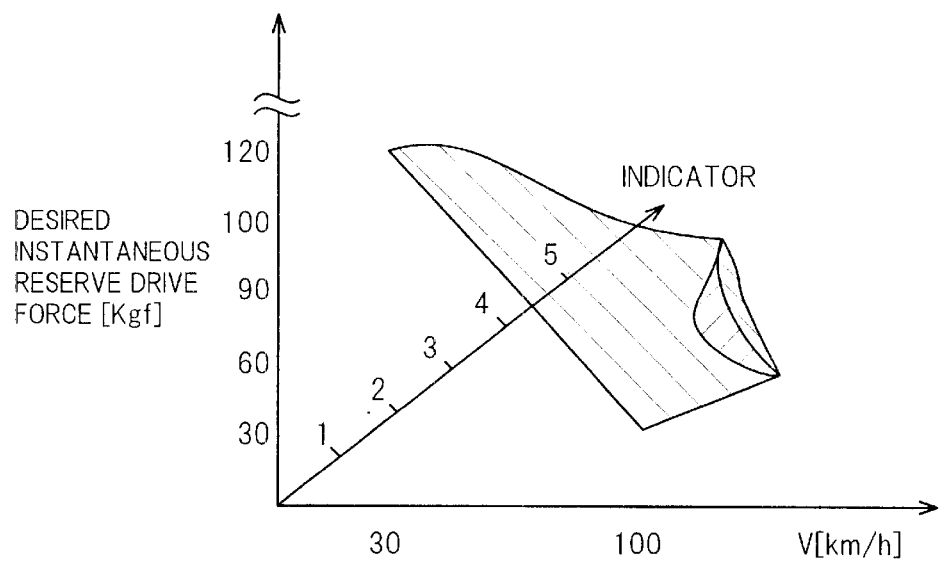
FIG. 15 is a graph for explaining instantaneous reserve drive force characteristics used in the uphill driving control of the flow chart of FIG. 2.

Specifically, as shown by FIG. 14 and the 3D-mapped representation thereof in FIG. 15, the desired instantaneous reserve drive force can be made variable with the estimated driving condition indicator, so as to decrease as the estimated driving condition indicator increases, i.e., as the operator's desire for driving force declines, and also to vary with the vehicle speed V. Specifically, the desired instantaneous reserve drive force is set to increase at low vehicle speed, when the speed adjustment capability required is greater than at high vehicle speed. When the desired instantaneous reserve drive force is set in this manner, noise generated when the engine speed becomes high at a high vehicle speed can be reduced and the unpleasantness of this noise mitigated.

Next, in S26, the set ratio is converted to the aforesaid indicator on a scale of 1 to 5 points by an appropriate method.

When it is found in S22 that the estimated slope $\theta$ is equal to or smaller than the prescribed value $\alpha$, it is judged that the vehicle is running downhill and the program goes to S28.

This will be explained with reference to the block diagram of FIG. 16. The model shown at the top of the drawing is used to set the ratio so as to make the driving force equal to the running resistance or to make the desired drive force 0. Specifically, as shown in FIG. 17, during hill descent the driving force fe produced by the engine braking effect acts on the vehicle in the decelerating direction and the running resistance R acts on the vehicle in the accelerating direction. The ratio is decided so that during throttle wide-open operation the engine braking force (indicated as−fe) and the running resistance R are equal. In FIG. 2, next, in S30, the determined ratio is again converted to the aforesaid indicator.

When it is found in S22 that the estimated slope estimated slope $\theta$ is greater than the prescribed value $\beta$ and equal to or smaller than the prescribed value $\alpha$, it is judged that the vehicle is running on a level road and the program goes to S32.

The level driving control will now be explained. The quality of drivability does not vary as markedly during level driving as during hill ascent/descent. In this embodiment, therefore, level driving control is effected to optimize fuel efficiency. This is achieved by utilizing the aforesaid Drive By Wire fashion (i.e., the stepper motor 18 and throttle control unit 400) to control the throttle valve opening and thereby control the driving force. Specifically, the ratio is controlled with respect to the instantaneous reserve drive force to control the throttle opening with respect to the driving force desired by the operator.

Figure 18:
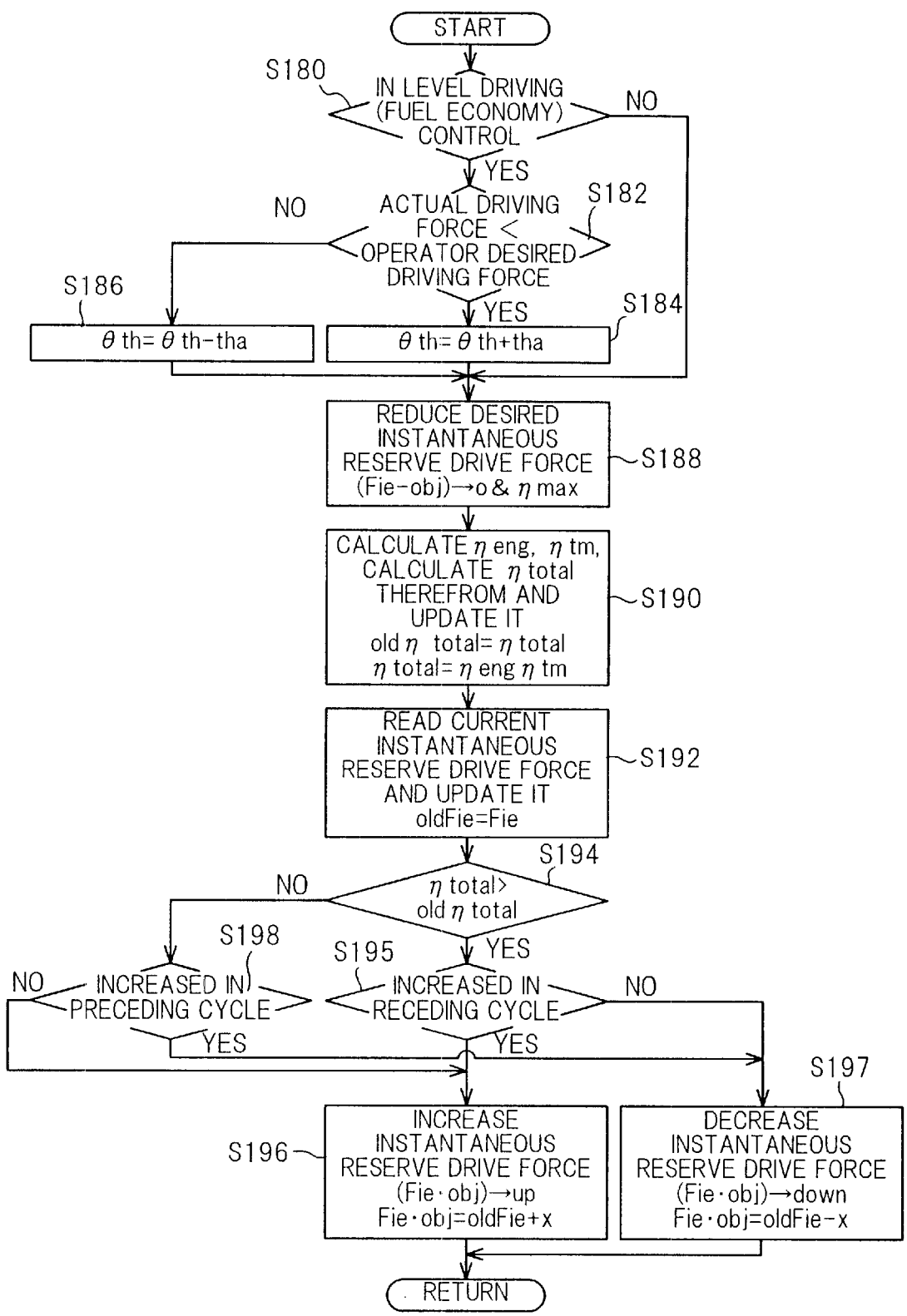
FIG. 18 is a flow chart for explaining the level driving control of the flow chart of FIG. 2.

FIG. 18 is a subroutine flow chart of showing this control. The illustrated program is executed at prescribed intervals, e.g., once every 0.1 sec.

A summary of the control will be set out first. The driving force desired by the operator is compared with the actual driving force and the throttle is opened/closed by a prescribed amount according to the result of the comparison. Next, the total efficiency $\eta$ total of the engine and the transmission is calculated and compared with that in the preceding cycle. When it is found that the efficiency has increased, then, if decreasing control of the desired instantaneous reserve drive force was effected in the preceding cycle, further decreasing-control is effected on the assumption that continuing the control in the decrease direction will further improve the efficiency. As a result, the ratio seeks higher gear levels. On the other hand, when it is found that the efficiency has decreased, the control is switched to increasing control. If the efficiency turns up, the increase direction is continued. Thus, the total efficiency change and the desired instantaneous reserve drive force control direction are discriminated and control is effected to achieve a high total efficiency.

This will now be explained in detail. In S180, it is checked whether level driving fuel economy control is currently in effect. When the result is YES, the program goes to S182, in which it is checked whether the actual driving force is smaller than the driving force desired by the operator. When the result is YES, the program goes to S184, in which a prescribed value tha is added to the current throttle opening θ th and the throttle valve 14 is controlled in the opening direction to obtain the sum value.

When the result in S182 is NO, the program goes to S186, in which the prescribed value tha is subtracted from the current throttle valve opening θ th and the throttle valve 14 is controlled in the closing direction to obtain the difference value. When the result in S180 is NO, the program skips S182 to S186.

Next, in S188, the desired instantaneous reserve drive force (designated "Fie-obj") is reduced toward zero by a prescribed amount. The program then goes to S190, in which, first, the efficiency ηeng of the engine 10 and the efficiency ηtm of the transmission 24 are calculated.

The engine efficiency ηeng and the transmission efficiency ηtm are determined by map retrieval. More specifically, the engine efficiency ηeng is retrieved from an optimum fuel efficiency map mapped as a function of the torque Te (calculated in S102) and the engine speed Ne. The transmission efficiency ηtm is retrieved from an optimum fuel efficiency map mapped as a function of the aforesaid NDR and NDN.

The total efficiency ηtotal is then calculated as the product of the retrieved engine efficiency ηeng and transmission efficiency ηtm and the value in the preceding cycle oldη total is updated by overwriting it with the calculated value (current value). In the first program cycle, the preceding value is appropriately set to, for example, zero. The total efficiency ηtotal indicates the engine and transmission efficiencyin terms of fuel economy.

Next, in S192, the current instantaneous reserve drive force (designated "Fie") is read and the value in the preceding cycle is updated by overwriting it with the read value.

Next, in S194, it is checked whether the current value (calculated value) is greater than the preceding value. When the result is YES, the program goes to S195, in which it is checked whether sequential incrementing control of the desired instantaneous reserve drive force (S196) was effected in the preceding cycle. When the result in S195 is YES, the program goes to S196, in which a prescribed value x is added to the desired instantaneous reserve drive force, and when NO, the program goes to S197, in which the prescribed value x is subtracted from the desired instantaneous reserve drive force.

When the result in S194 is NO, the program goes to S198, in which it is checked whether sequential incrementing control of the desired instantaneous reserve drive force was effected in the preceding cycle. When the result is YES, the program goes to S197, and when NO, the program goes to S196.

Figure 19:
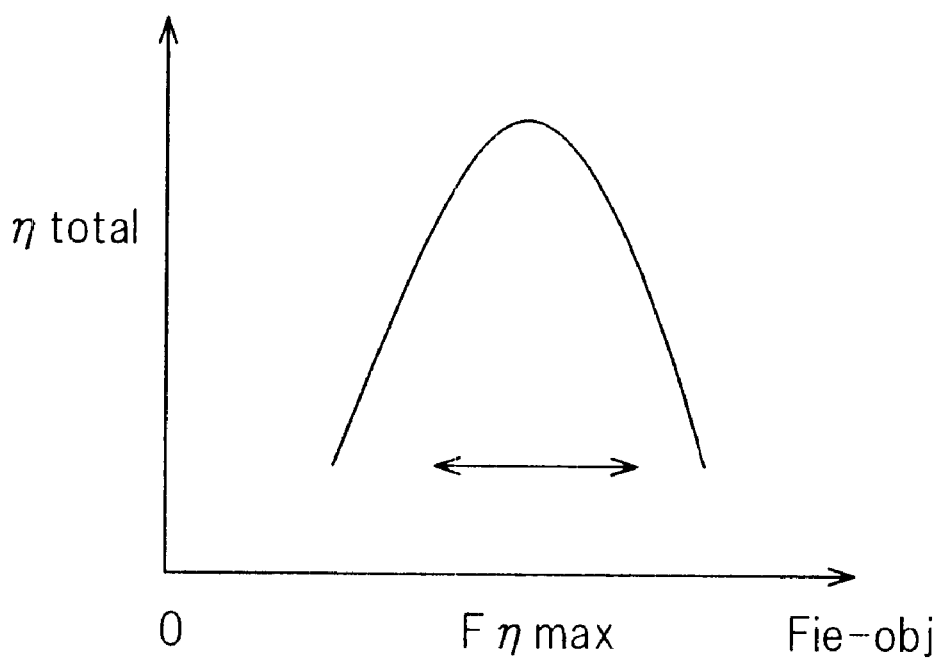
FIG. 19 is a graph for explaining the processing of FIG. 18.

By effecting the processing of S196 and S197 taking the processing in the preceding cycle into account, the desired instantaneous reserve drive force can be controlled to maximize ηtotal. Specifically, as shown in FIG. 19, by increasing/decreasing the desired instantaneous reserve drive force it can be brought to and trapped at the desired instantaneous reserve drive force value Fη max at which the total efficiency is optimum in terms of fuel economy.

The substraction of the prescribed value from the desired instantaneous reserve drive force value amounts to controlling the driving force by shifting the ratio of the transmission toward the high ratio side by an amount corresponding to the prescribed amount x and the addition of the prescribed value to the desired instantaneous reserve drive force value amounts to controlling the driving force by shifting the ratio of the transmission toward the low ratio side by an amount corresponding to the prescribed amount x.

More specifically, to effect driving with the desired instantaneous reserve drive force value being shifted toward zero causes driving to be effected with the throttle opening being shifted toward wide-open, irrespective of the accelerator pedal position. Since the engine efficiency offering optimum fuel economy is ordinarily obtained in the vicinity of throttle wide-open, the optimum point can, at a substantially constant transmission transfer efficiency, be achieved by shifting the desired instantaneous reserve drive force value toward zero. As shown in FIG. 19, therefore, the fuel economy can be optimized by trapping the desired instantaneous reserve drive force value at the optimum point Fη max.

Again returning to the flow chart of FIG. 2, when the result in S20 is NO, it is judged that the operator wants sporty driving and the program goes to S34, in which the ratio is set using the instantaneous reserve drive force or the driving force, and then goes to S36, where the set ratio is converted to an indicator. (Since this control is characterized chiefly by relaxed driving, it will not be explained in detail here.)

Next, in S38, the obtained ratio is converted to a ratio control output indicator, whereafter, in S40, the obtained indicator is applied to the vertical axis of the illustrated characteristics to determine a ratio coefficient (ratio multiplier) on the horizontal axis. Next, in S42, the base (ratio) map value (retrieved using the throttle opening and the vehicle speed as address data) is multiplied by the obtained ratio multiplier to determine the ratio.

The processing in S126 of the flow chart of FIG. 8 will now be explained.

Unlike the aforesaid processing for discrimination of driving condition (uphill/downhill), this processing is for discriminating road slipperiness and effecting ratio control based thereon. Specifically, multiple road conditions are discriminated and ratio control is carried based on the result.

Figure 20:
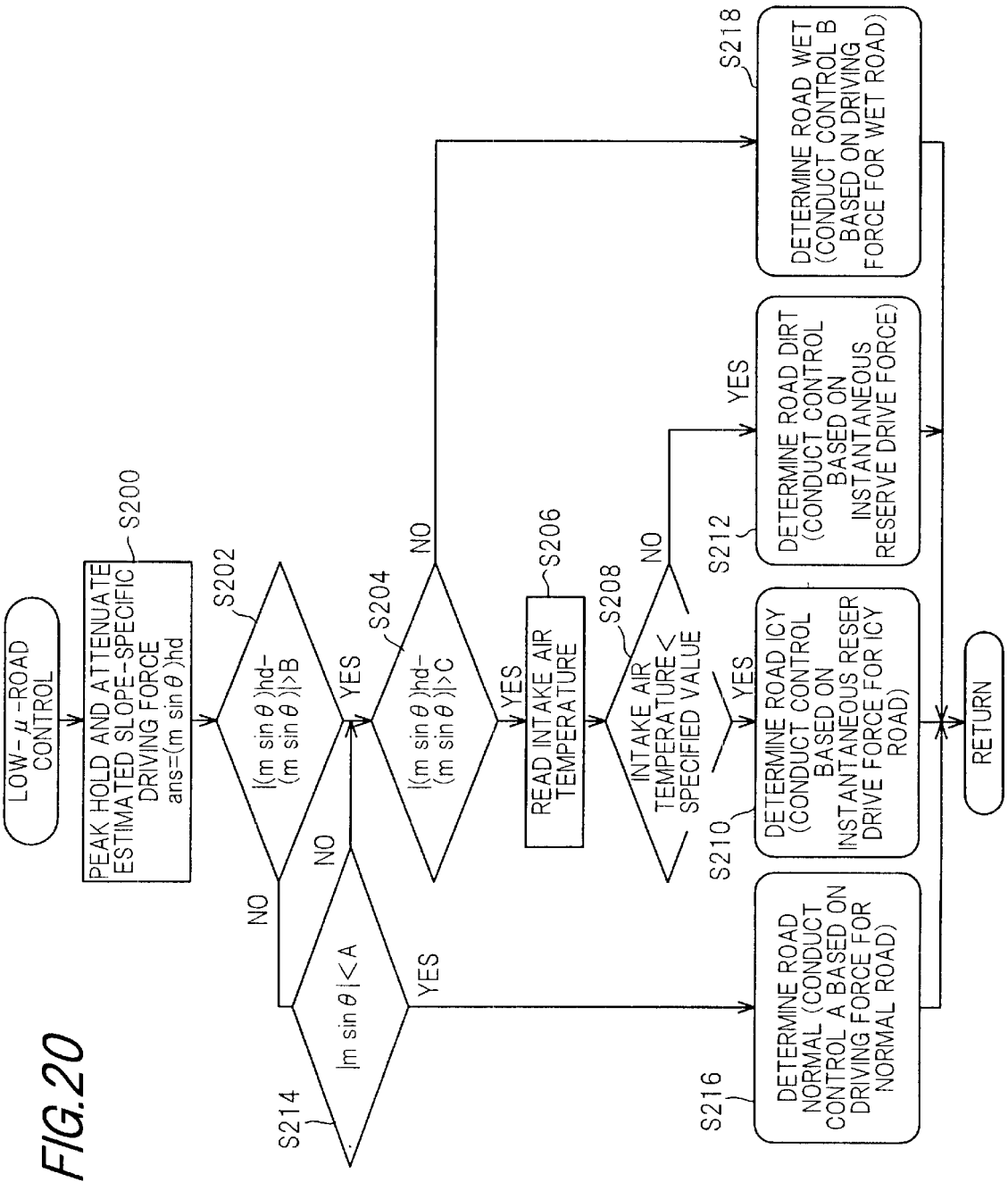
FIG. 20 is a subroutine flow chart for the control on roads including low-$\mu$-road of FIG. 8.
Figure 21:
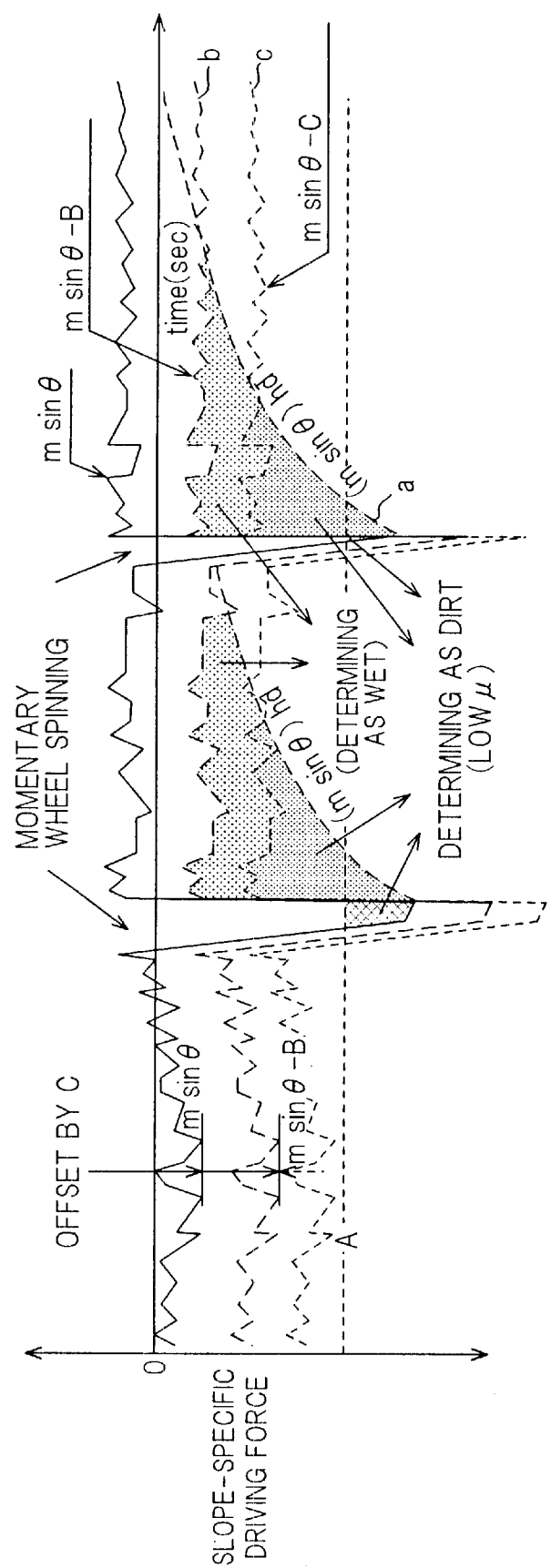
FIG. 21 is a time chart for explaining the processing of the flow chart of FIG. 20.

FIG. 20 is a subroutine flow chart for explaining the processing of S126 and FIG. 21 is a graph representing change in slope-specific driving force with road condition.

In S200 of the flow chart or FIG. 20, the estimated slope-specific driving force calculated earlier is subjected to peak-holding and time-course decrementing. More specifically, the estimated slope-specific driving force is held, a prescribed amount is subtracted therefrom every program cycle, and when a larger value is calculated, it overwrites the existing value.

The processing of S200 will be explained with reference to FIG. 21. When the vehicle spins or slips, the value of sin θ obtained by the aforesaid processing, i.e., the value of the estimated slope-specific driving force (m sin θ) is calculated to have a peak on the negative side. In this processing, the value of the estimated slope-specific driving force at peak is held, a time-course decremented value is calculated ((msin θ)hd), and this is used to discriminate the road condition.

Next, in S202, it is checked whether the absolute value of the difference between the time-course-decremented value and the slope-specific driving force is greater than a prescribed value B. Specifically, it is checked whether the attenuation curve (designated a in FIG. 21) of the time-course decremented estimated slope-specific driving force at peak is smaller than the value (designated b in FIG. 21)

obtained by subtracting the prescribed value B from estimated slope-specific driving force. When the result in S202 is YES, it is judged that the vehicle is traveling on a low-$\mu$-road with low traction (coefficient of friction) and the program goes to S204, in which the difference between the absolute value of the difference between the time-course-decremented value of the estimated slope-specific driving force at peak and the slope-specific driving force (m sin θ) is calculated again, whereafter it is checked whether the calculated value is greater than a prescribed value C. Specifically, it is checked whether the attenuation curve (designated a in FIG. 21) of the time-course decremented estimated slope-specific driving force at peak is smaller than the value (designated c in FIG. 21) obtained by subtracting the prescribed value C from estimated slope-specific driving force.

Next, in S206, the value output by the intake air temperature sensor 107 is read as corresponding to the outside air temperature. Then, in S208, it is checked whether the intake air temperature (outside air temperature) is lower than a specified value. The specified value is appropriately set to enable discrimination of icy road condition. When the result in S208 is YES, the program goes to S210, in which the road is determined to be icy and instantaneous reserve drive force control for icy road is conducted. When the result in S208 is NO, it is judged that the vehicle is running on a dirt road with very poor traction and the program goes to S212, in which instantaneous reserve drive force control for bad road is conducted.

Figure 23:
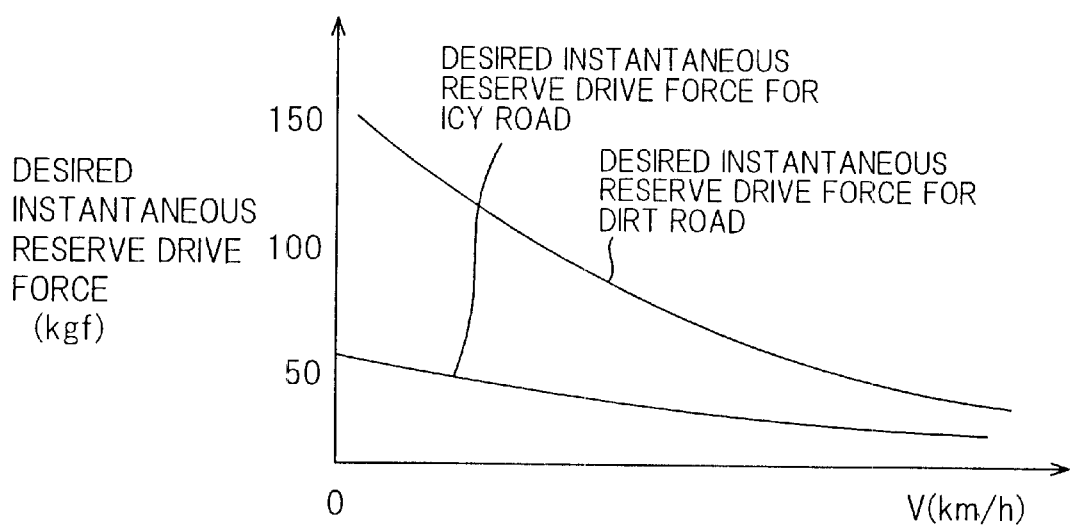
FIG. 23 is a graph showing desired instantaneous reserve drive force characteristics used in the processing of the flow chart of FIG. 20.

The processing in S212 etc. will be explained. The current vehicle speed V is used to retrieve the desired instantaneous reserve drive force from pre-established characteristics. FIG. 23 is a graph showing the characteristics.

As shown in FIG. 23, separate desired instantaneous reserve drive force characteristics are established for use when icy road is discriminated and when bad road is discriminated. When icy road is discriminated, instantaneous reserve drive force control is conducted with the desired value set lower than at normal times and, when bad road is discriminated, instantaneous reserve drive force control is conducted with the desired value set higher than at normal times.

Specifically, as shown in FIG. 13, the desired instantaneous reserve drive force is subtracted from the instantaneous reserve drive force, the difference is multiplied by a coefficient k, and the result is input to a predefined conversion table as input u to obtain an output x that is an indicator. Next, the output x obtained is, as indicated, input to a predefined conversion table to obtain an output y that is a ratio coefficient.

Driving force control is thus conducted with the instantaneous reserve drive force, an index of response to accelerator pedal position change, as the target value, and the desired value is set to a lower value than the instantaneous reserve drive force during normal times so as to suppress occurrence of abrupt driving force change on icy and bad roads and thereby prevent spin and the like.

On the other hand, when the result in S202 is NO, the program goes to S214, in which it is checked whether the absolute value of the slope-specific driving force or resistance (m sin θ) is smaller than a prescribed value A. When the result in S214 is NO, it is judged that the vehicle is traveling on a low-$\mu$-road with low traction the program goes to S204 and ensuing steps to conduct low-$\mu$-road control, and when it is YES, the program goes to S216, in which the road is judged to be normal and control is conducted based on driving force for normal road.

Figure 22:
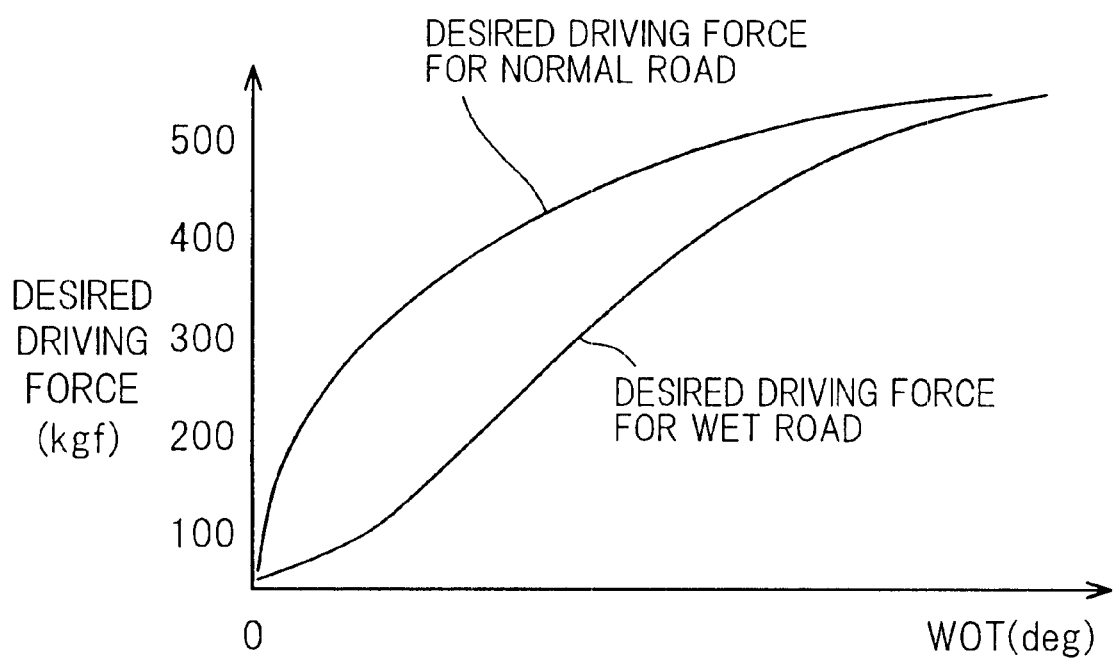
FIG. 22 is a graph showing driving force characteristics used in the processing of the flow chart of FIG. 20.

Specifically, the desired driving force is decided in accordance with the characteristics shown in FIG. 22, the calculated actual driving force is subtracted from the desired driving force, and the ratio is set to the product of the difference and the coefficient k.

Still more specifically, the produced engine torque is calculated from the engine speed Ne and the accelerator pedal position θ acc, the desired driving force is decided from the calculated torque and the vehicle speed V, and the ratio is controlled to obtain the decided desired driving force.

When the result in S204 is NO, the program goes to S218, in which the road is judged to be wet and instantaneous reserve drive force control for wet road is conducted.

Specifically, the desired value is determined from the driving force curve for wet road in FIG. 22 and the ratio is set as in the case of the driving force control for normal road in S216. Thus, when wet road is discriminated, the desired value is set lower than that for driving force control for normal road and the ratio is set based on the set driving force.

The mountain/town road discrimination of S11 of the flow chart of FIG. 2 will now be explained.

Figure 24:
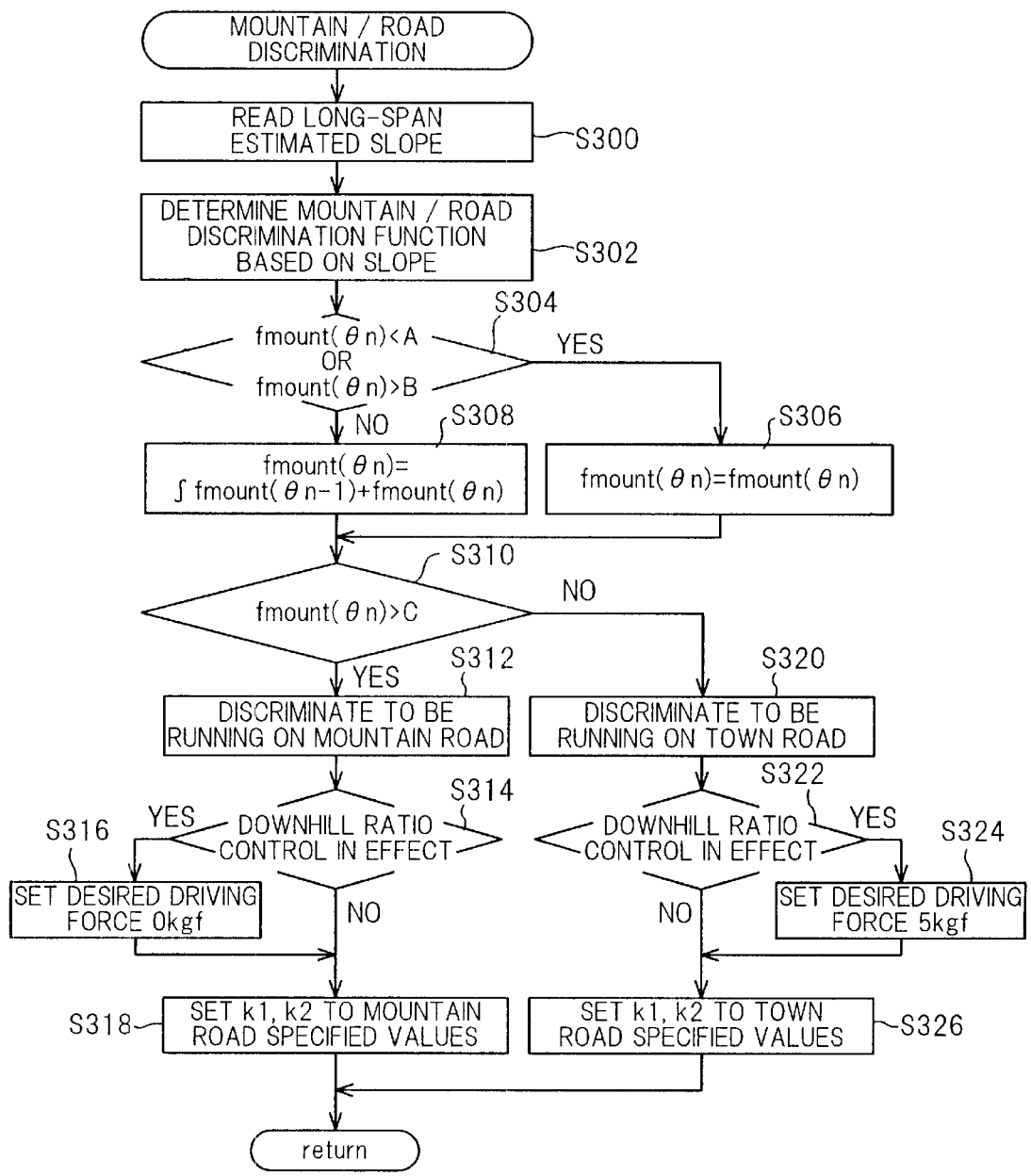
FIG. 24 is a subroutine flow chart of the processing for the mountain/town road discrimination of the flow chart of FIG. 2.
Figure 25:
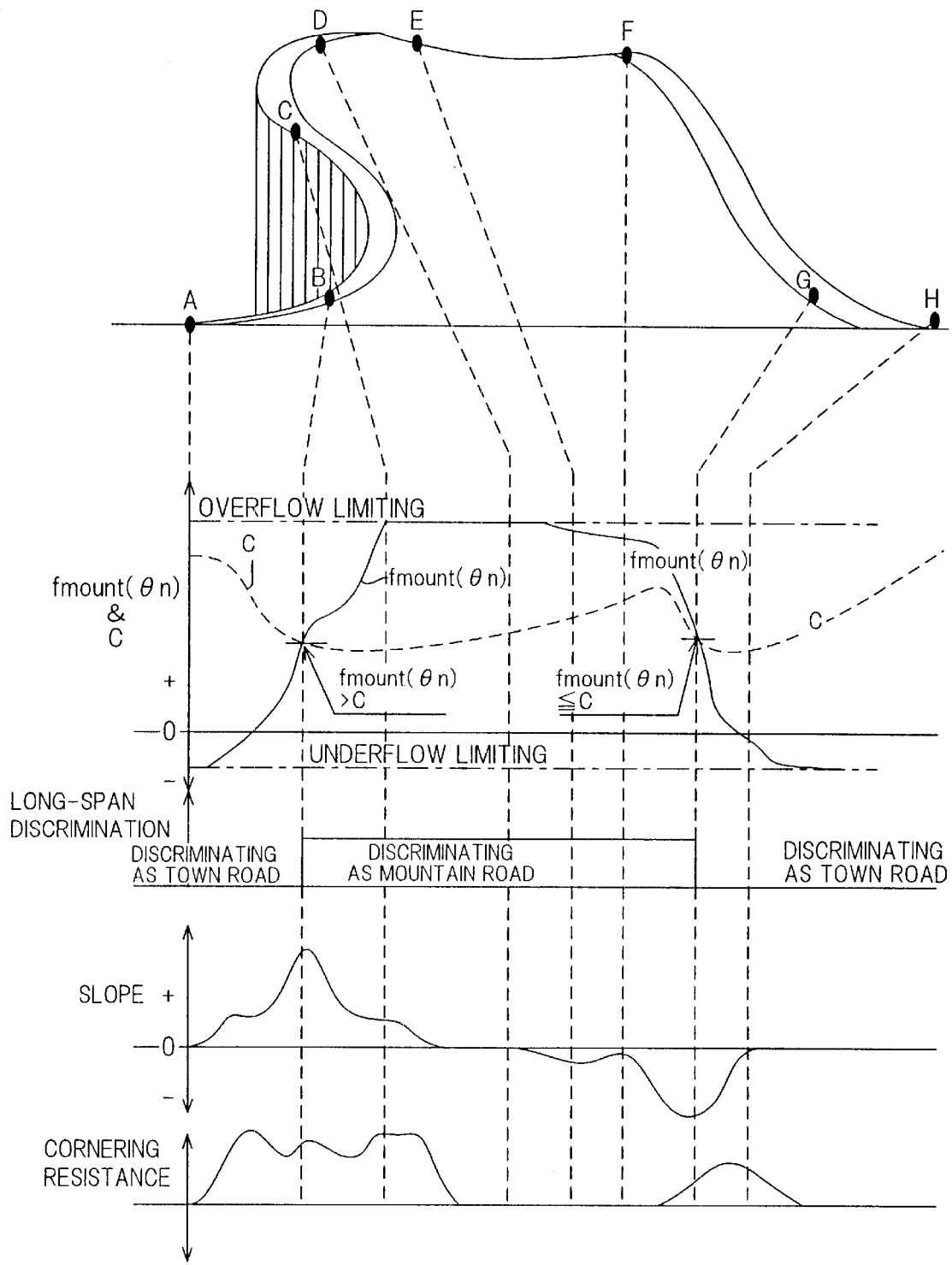
FIG. 25 is a diagram for explaining the processing of the flow chart of FIG. 24.

FIG. 24 is a subroutine flow chart for explaining this processing and FIG. 25 is a diagram for explaining the processing.

This processing utilizes the concept of a function fmount (θn) for mountain/town road discrimination to discriminate whether the region the vehicle is running in is a mountainous region or an urban region and appropriately changes the regulation gains k1 and k2 of the instantaneous reserve drive force and the driving force according to the result. Specifically, it changes the control response (speed of convergence on desired value) according to the driving conditions.

Figure 26:
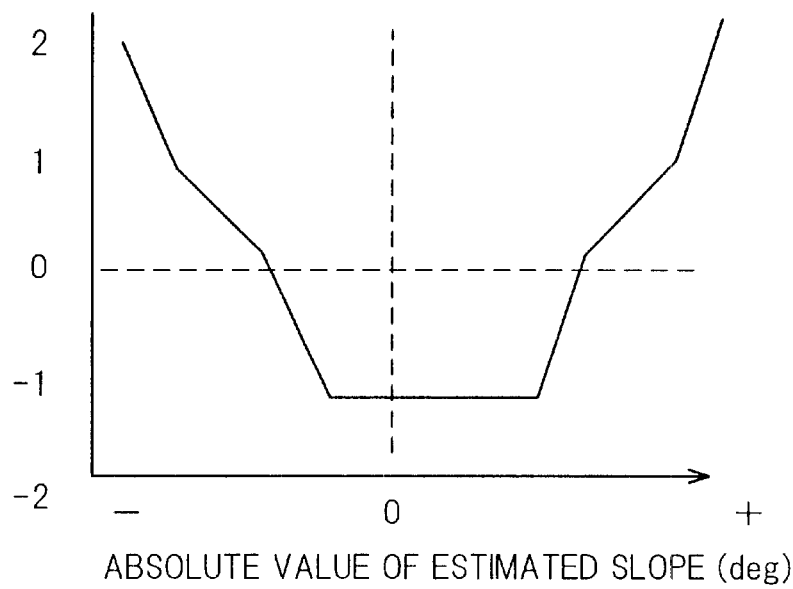
FIG. 26 is a graph showing the characteristic curve of a mountain/town road discrimination function fmount θ n used in the flow chart of FIG. 24.

FIG. 26 is the characteristic curve of the function for mountain/town road discrimination. The function for mountain/town road discrimination indicates the degree to which the region in which the vehicle is currently running is mountainous or urban. The degree is determined by applying the absolute value of the estimated slope θ to the characteristic curve of FIG. 26.

The characteristic curve of the function for mountain/town road discrimination is therefore established so that the integrated value becomes large when driving on a mountainous road having many sharp slopes and becomes a small value when driving on an urban road having only gradual slopes.

Figure 27:
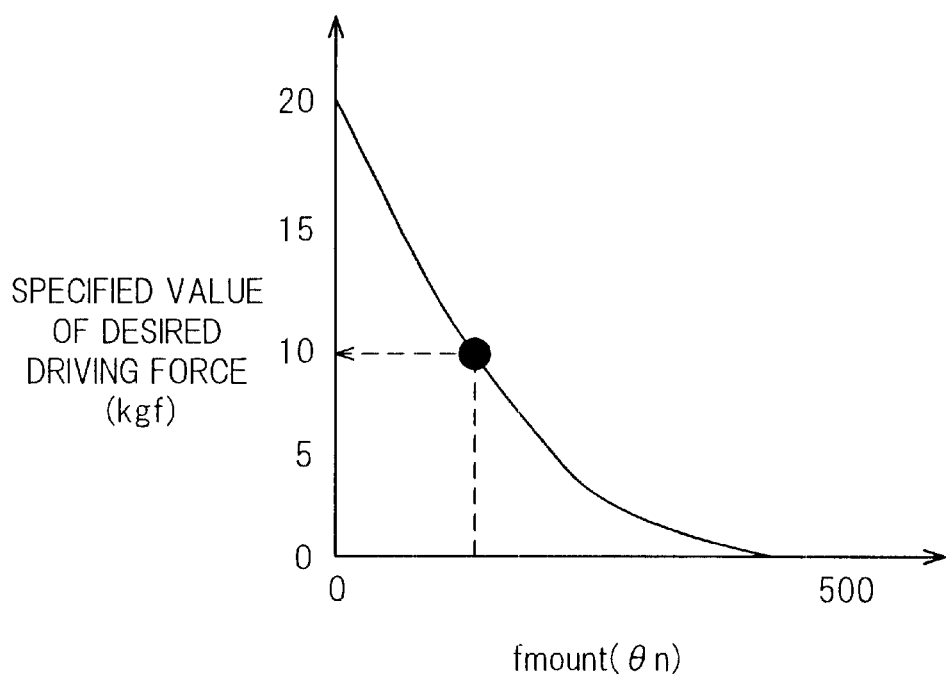
FIG. 27 is a graph showing a characteristic curve used in the flow chart of FIG. 24 to determine a desired driving force from the mountain/town road discrimination function.

This function for mountain/town road discrimination is applied to the characteristic curve of FIG. 27 to obtain the desired driving force. As a result, when the value of the mountain/town road discrimination function is large, i.e., when the resemblance to a mountain road is high, the running resistance and the driving force (engine braking force) are equal (desired driving force=0) and speed change during hill descent is small. When the mountain/town road discrimination function is small, i.e., when the resemblance to a town road is high, the desired drive force is large.

Thus during hill descent on a mountain road, the desired driving force becomes zero to make the running resistance and the engine braking force the same, thereby preventing speed increase during downhill driving. During hill descent on a town road, normal engine braking capability is maintained to minimize incompatibility with other vehicles ahead and behind.

The flow chart of FIG. 24 will now be explained. In S300, the long-span estimated slope θ long is read.

Next, S302, the long-span estimated slope θ long is used to determine the mountain/town road discrimination function. The program then goes to S304, in which it is checked whether the determined mountain/town road discrimination function is smaller than the prescribed value A and larger than the prescribed value B. The prescribed values A and B are an overflow limiter and an underflow limiter, respectively.

When the result in S304 is YES, the program goes to S306, in which the mountain/town road discrimination function is held. When the result in S304 is NO, i.e., when fmount(θn) is equal to or greater than the prescribed value A or equal to or smaller than the prescribed value B, the program goes to S308, in which the limit value A or B is held as the mountain/town road discrimination function fmount (θn).

Figure 28:
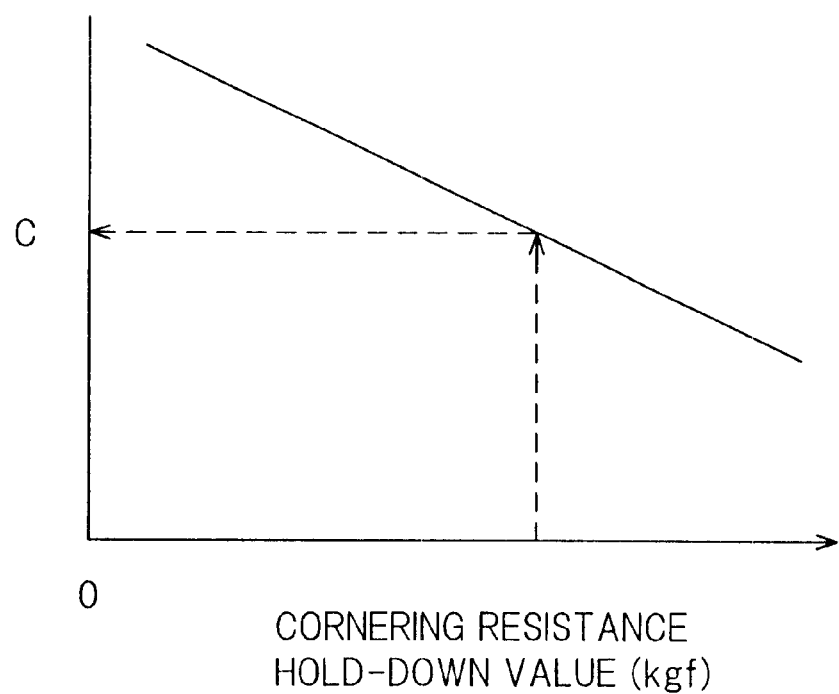
FIG. 28 is a graph showing the characteristic of a prescribed value C used in the flow chart of FIG. 24.

Next, in S310, it is checked whether the determined mountain/town road discrimination function is larger than the prescribed value C. The prescribed value C is a mountain road discrimination threshold whose value is set to the time-course attenuated value of the cornering resistance Rc peak-hold value. FIG. 28 is the characteristic curve of the mountain road discrimination threshold value.

As shown in FIG. 28, the mountain road discrimination threshold value C is determined using the time-course attenuated peak-hold value of the cornering resistance Rc. As shown, the mountain road discrimination threshold value is made inversely proportional to the cornering resistance hold-down value. By this, even in the case of a road with relatively gradual slopes, the threshold stays at a small value if many sharp curves are encountered, i.e., when the calculated value of the cornering resistance is high. This makes it easier to discriminate mountain roads.

When the result in S310 of the flow chart of FIG. 24 is YES, the program goes to step S312, in which the vehicle is discriminated to be running on a mountain road, and then to S314, in which it is checked whether downhill ratio control is in effect.

When the result in S314 is YES, the program goes to S316, in which the desired driving force is set to 0. This is effected because mountain roads undulate markedly and is aimed at suppressing speed fluctuation and enabling downhill speed to be kept constant even when the downhill slope varies.

Next, in S318, the regulation gains k1 and k2 of the instantaneous reserve drive force and the driving force are set to predefined mountain road specified values. When the result in S314 is NO, the program skips S316 and goes to S318.

When the result in S310 is NO, the program goes to S320, in which the vehicle is discriminated to be running on a town road, and then to S322, in which it is checked whether the vehicle is conducting driving force control (downhill ratio control).

When the result in S322 is YES, the program goes to S324, in which the desired driving force is set to a specified value (e.g., 5 kgf). This is effected because on ordinary downhill slopes, such as on a town road, in light of the need to keep pace with the traffic flow, it is preferable to be somewhat on the accelerating side and it is aimed to effect ratio control in the direction that produces somewhat positive driving force. However, even a single braking operation in this state causes the desired driving force to be set to 0 to effect ratio control for minimizing speed change.

In the processing of S324, it is also possible to maintain the ratio constant while using an appropriate map to impart a desired driving force for establishing a linear vehicle speed-engine speed characteristic like that of a manual transmission.

Next, in S326, the regulation gains k1 and k2 are set to predefined town road specified values. When the result in S322 is NO, the program skips S324 and goes to S326.

The mountain road specified values of the gains k1 and k2 are set higher than their town road specified values so that the ratio control is effected with higher response during mountain road driving than during town road driving.

Owing to the configuration described in the foregoing, the system according to this embodiment enhances drivability by effecting speed ratio control that closely reflects the intention of the operator. Moreover, the system can estimate the road slope accurately, without estimation lag, and control the gear ratio (speed ratio) optimally, thereby enhancing drivability.

Thus, the embodiment is configured to have a system for controlling an automatic transmission (24) of a vehicle (29) having an input shaft (28) connected to an internal combustion engine (10) mounted on the vehicle and an output shaft (30) connected to driven wheels of the vehicle, the transmission transmitting output torque generated by the engine and inputted through the input shaft to the driven wheels through the output shaft. The characteristic features of the system is that it includes operating condition detecting means (coolant temperature sensor 106, throttle position sensor 108, accelerator position sensor 110, brake switch 112, vehicle speed sensor 122, etc.) for detecting operating conditions of the engine and the vehicle including at least a vehicle speed (v) and a throttle opening (θth); running resistance calculating means (integrated control unit 300, S108) for calculating a running resistance (R) acting on the vehicle; driving force calculating means (integrated control unit 300, S14, S104) for calculating a driving force (F) generated by the vehicle; slope estimating means (integrated control unit 300, S10, S106, S110, S114–S124, S134, S136, S142) for estimating a slope (θ)of a road on which the vehicle travels based on at least the calculated running resistance and the driving force; running state discriminating means (integrated control unit 300, S22) for comparing the estimated slope with a predetermined value (α, β) and for discriminating a running state of the vehicle; gear ratio determining means (integrated control unit 300, S14–S18, S24–S42, S316, S324, FIG. 13 block diagram) for calculating a maximum driving force to be generated by the vehicle at a current gear ratio to calculate a driving force difference (instantaneous reserve drive force) from the calculated driving force and for determining a gear ratio such that the driving force difference is a predetermined value (desired instantaneous reserve drive force) in response to the discriminated running state; and transmission operating means (transmission control unit 100) for operating the transmission in response to the determined gear ratio. With this, the drivability is enhanced by enabling speed ratio control matched to the slope of the road.

In the system, the gear ratio determining means corrects the calculated driving force difference based on at least one of the estimated slope and the detected vehicle speed (V, as illustrated in the characteristics of the desired instantaneous reserve drive force in FIG. 14 and the inclined characteristic of the desired instantaneous reserve drive force in FIG. 15). With this, the drivability is enhanced by enabling control even better matched to the slope of the road.

In the system, the gear ratio determining means corrects the calculated driving force difference based on at least the throttle opening (θ th) and a change in the throttle opening (dth, as illustrated in S14–S18 and the characteristics of the desired instantaneous reserve drive force in FIG. 14). With this, the drivability is enhanced by enabling control matched to both the slope of the road and the desire of the operator.

Figure 16:
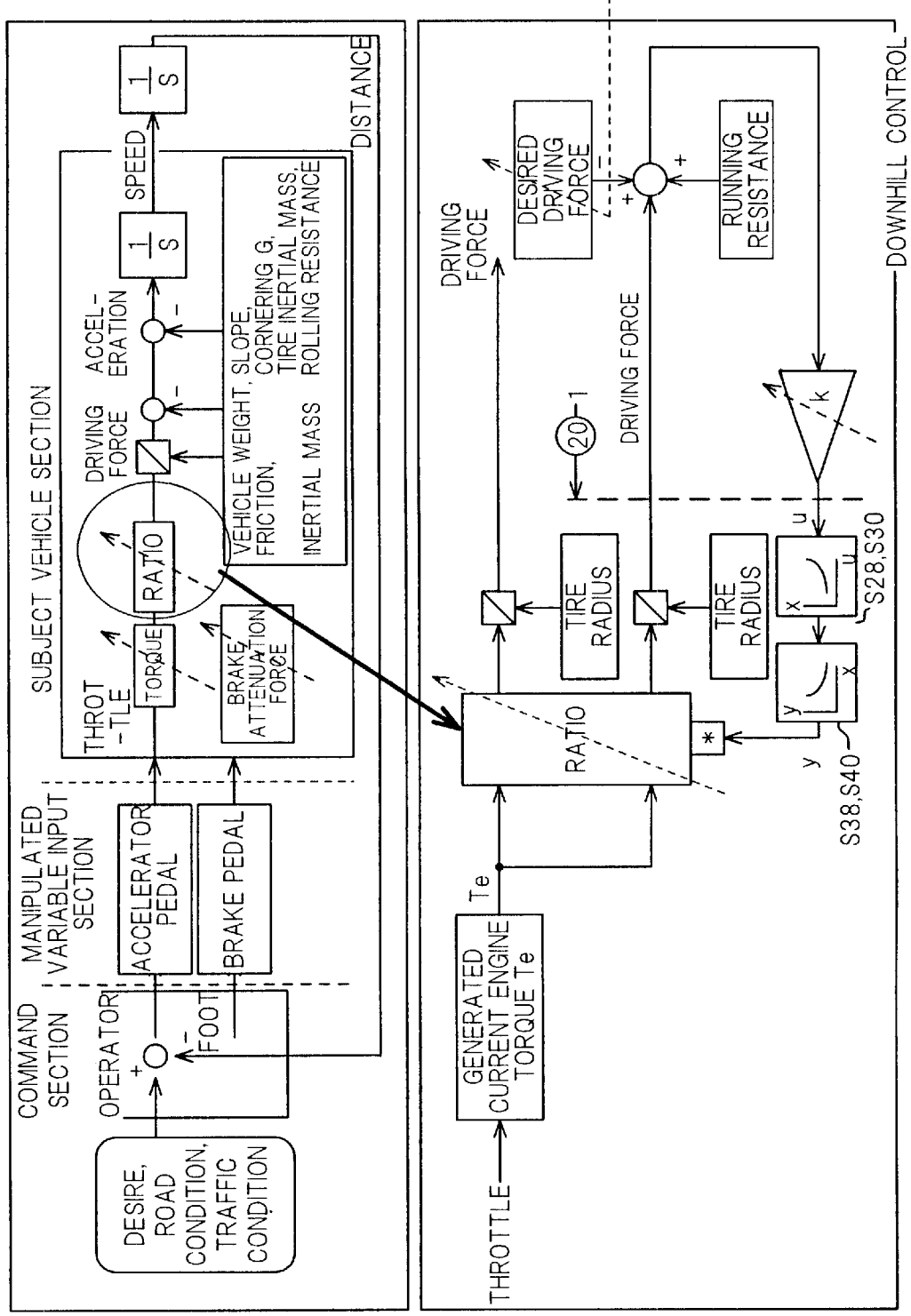
FIG. 16 is a block diagram for explaining the downhill driving control of the flow chart of FIG. 2.
Figure 17:
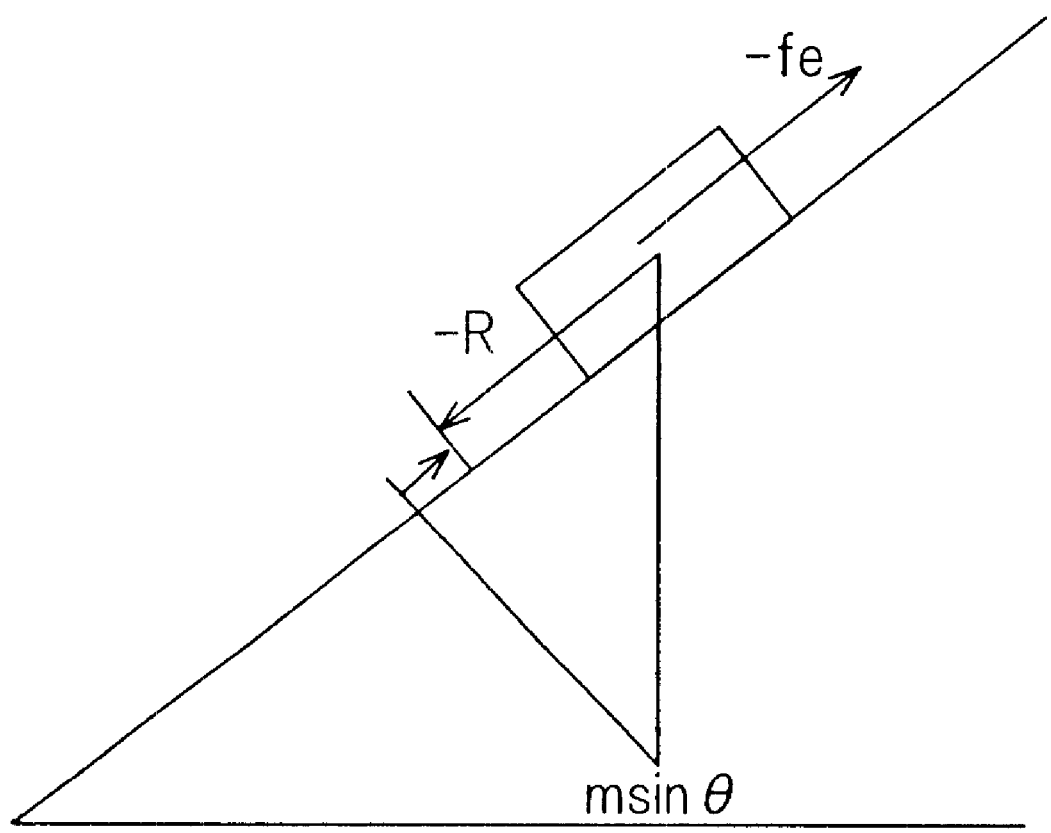
FIG. 17 is a diagram for explaining the downhill driving control of the flow chart of FIG. 2.

In the system, the gear ratio determining means determines the gear ratio based on the calculated driving force difference and the running resistance when it is discriminated that the vehicle is hill-descending (as shown in S24–S40 and FIG. 16 block diagram). With this, the drivability is enhanced by enabling control matched to the slope, particularly downhill slope, of the road.

In the system, the gear ratio determining means determines the gear ratio such that the calculated driving force difference becomes equal to the calculated running resistance, when it is discriminated that the vehicle is hill-descending, as shown in S28, S316). With this, the drivability is enhanced by enabling control matched to the desire of the operator during downhill driving.

In the system, the gear ratio determining means determines the gear ratio such that a difference between the calculated driving force difference and the calculated running resistance becomes a predetermined value, when it is discriminated that the vehicle is hill-descending, as shown in S28, S324) With this, the drivability is enhanced by enabling control matched to the desire of the operator during downhill driving.

In the system, the slope estimating means includes; vehicle acceleration detecting means (integrated control unit 300, S134) for detecting the vehicle acceleration (dv) of the vehicle; data processing time constant changing means (integrated control unit 300, S100, S136) for changing a time constant of data processing necessary for the estimation of the slope in response to the detected vehicle acceleration. With this, the system can estimate the road slope accurately, without estimation lag, and control the gear ratio (speed ratio) optimally, thereby enhancing drivability.

In the system, the slope estimating means includes; braking force estimating means (integrated control unit 300, S114–S124) for estimating a braking force based on the estimated slope before braking and the estimated slope during braking when a brake is operated; and holds the estimated slope based on the estimated braking force. With this, the system can estimate the road slope more accurately, without estimation lag, and control the gear ratio (speed ratio) optimally, thereby enhancing drivability.

In the system, the slope estimating means includes; cornering resistance estimating means (integrated control unit 300, S106, S142) for estimating a cornering resistance based on a turning force of the vehicle; and corrects the estimated slope based on the estimated cornering resistance. With this, the system can estimate the road slope better with high response.

Moreover, the embodiment is configured to have a system for controlling an automatic transmission (24) of a vehicle (29) having an input shaft (28) connected to an internal combustion engine (10) mounted on the vehicle and an output shaft (30) connected to driven wheels of the vehicle, the transmission transmitting output torque generated by the engine and inputted through the input shaft to the driven wheels through the output shaft. The characteristic features of the system is that it includes operating condition detecting means (coolant temperature sensor 106, throttle position sensor 108, accelerator position sensor 110, brake switch 112, vehicle speed sensor 122, etc.) for detecting operating conditions of the engine and the vehicle including at least a vehicle speed (v) and a throttle opening (θth); actual driving force calculating means (integrated control unit 300, S14, FIG. 7) for calculating an actual driving force generated by the vehicle based on at least the detected throttle opening; operator desire estimating means (integrated control unit 300, S14–S18, FIG. 7) for estimating a value desired by a vehicle operator based on at least the detected throttle opening (more specifically, operator desire estimating means for inputting the detected throttle opening to a first predetermined mode describing the operating condition of the vehicle and for calculating the operator desire estimated value in throttle opening and throttle opening change); indicator conversion means (integrated control unit 300, S14–S18, FIG. 4) for converting the actual driving force and the operator desire estimated value to an evaluation indictor (more specifically, subject vehicle driving force calculating means (integrated control unit 300, S14–S18 and FIG. 4) for inputting the detected throttle opening to a first predetermined model describing an ideal vehicle response to calculate the desired output desired by the vehicle operator and for calculating the driving force of the subject vehicle based on a driving force difference from the calculated driving force); running characteristic discriminating means (integrated control unit 300, S16–S20) for discriminating based on the evaluation indicator which of a first running characteristic and a second running characteristic, that are different in driving force response, the vehicle operator wants; and driving force controlling means (integrated control unit 300, S22, S32, S180–S190) for controlling a driving force of the vehicle through at least one of an output of the engine and a gear ratio in accordance with the discriminated running characteristic. With this, enhanced drivability and improved fuel efficiency performance are both achieved by enabling driving force control that is matched to the desire of the operator while being tempered by the vehicle driving condition.

In the system, the driving force controlling means includes: slope estimating means (integrated control unit 300, S10, S24, S28) for estimating a slope of a road on which the vehicle travels; and desired driving force determining means (integrated control unit 300, S200–S218) for determining a desired driving force based on the estimated slope; and wherein the driving force controlling means feedback-controls such that the driving force converges the desired driving force. With this, enhanced drivability and improved fuel efficiency performance are both achieved by enabling driving force control that is matched to the desire of the operator while being tempered by the vehicle driving condition.

In the foregoing, as shown in FIG. 29, it is also possible to add the slope as a running state indicator.

While the invention has thus been shown and described with reference to specific embodiments, it should be noted that the invention is in no way limited to the details of the described arrangements but changes and modifications may be made without departing from the scope of the appended claims.

What is claimed is:

1. A system for controlling an automatic transmission of a vehicle having an input shaft connected to an internal combustion engine mounted on the vehicle and an output shaft connected to driven wheels of the vehicle, the transmission transmitting output torque generated by the engine and inputted through the input shaft to the driven wheels through the output shaft, wherein the improvement comprises:
operating condition detecting means for detecting operating conditions of the
engine and the vehicle including at least a vehicle speed and a throttle opening;
running resistance calculating means for calculating a running resistance acting on the vehicle;
driving force calculating means for calculating a driving force generated by the vehicle using a model representing a difference between ideal vehicle response and actual vehicle response;

slope estimating means for estimating a slope of a road on which the vehicle travels based on at least the calculated running resistance and the driving force;

running state discriminating means for comparing the estimated slope with a predetermined value and for discriminating a running state of the vehicle;

desired driving force selecting means for determining a slope-specific driving force based on at least the estimated slope of the road, for comparing the determined slope-specific driving force with a prescribed value and for selecting one of desired driving forces prepared separately for condition of the road determining the running state of the vehicle based on a result comparison;

gear ratio determining means for calculating a maximum driving force to be generated by the vehicle at a current gear ratio and an engine speed obtained if an accelerator pedal that is not mechanically connected to the throttle is assumed to be fully depressed, to calculate a driving force difference from the calculated driving force and for determining a gear ratio such that the driving force difference becomes the selected desired driving force for the discriminated running state; and transmission operating means for operating the transmission in response to the determined gear ratio;

wherein the gear ratio determining means corrects the calculated driving force difference based on at least one of the estimated slope and the detected vehicle speed.

2. A system according to claim 1, wherein the gear ratio determining means corrects the calculated driving force difference based on at least the throttle opening and a change in the throttle opening.

3. A system according to claim 1, wherein the gear ratio determining means determines the gear ratio based on the calculated driving force difference and the running resistance when it is discriminated that the vehicle is hill-descending.

4. A system according to claim 3, wherein the gear ratio determining means determines the gear ratio such that the calculated driving force difference becomes equal to the calculated running resistance, when it is discriminated that the vehicle is hill-descending.

5. A system according to claim 3, wherein the gear ratio determining means determines the gear ratio such that a difference between the calculated driving force difference and the calculated running resistance becomes a predetermined value, when it is discriminated that the vehicle is hill-descending.

6. A system according to claim 1, wherein the slope estimating means includes;

vehicle acceleration detecting means for detecting the vehicle acceleration of the vehicle;

data processing time constant changing means for changing a time constant of data processing necessary for the estimation of the slope in response to the detected vehicle acceleration.

7. A system according to claim 1, wherein the slope estimating means includes;

braking force estimating means for estimating a braking force based on the estimated slope before braking and the estimated slope during braking when a brake is operated;

and holds the estimated slope based on the estimated braking force.

8. A system according to claim 1, wherein the slope estimating means includes;

cornering resistance estimating means for estimating a cornering resistance based on a turning force of the vehicle;

and corrects the estimated slope based on the estimated cornering resistance.

9. A system for controlling an automatic transmission of a vehicle having an input shaft connected to an internal combustion engine mounted on the vehicle and an output shaft connected to driven wheels of the vehicle, the transmission transmitting output torque generated by the engine and inputted through the input shaft to the driven wheels through the output shaft, wherein the improvement comprises:

operating condition detecting means for detecting operating conditions of the engine and the vehicle including at least a vehicle speed and a throttle opening;

actual driving force calculating means for calculating an actual driving force generated by the vehicle based on at least the detected throttle opening using a model representing a difference between ideal vehicle response and actual vehicle response;

operator desire estimating means for estimating a value desired by a vehicle operator based on at least the detected throttle opening using a model describing the vehicle operator desire based on a position of an accelerator;

slope estimating means for estimating a slope of a road on which the vehicle travels based on at least a running resistance acting on the vehicle and the calculated actual driving force;

desired driving force selecting means for determining a slope-specific driving force based on at least the estimated slope of the road, for comparing the determined slope-specific driving force with a prescribed value and for selecting one of desired driving forces prepared separately for condition of the road based on a result comparison;

indicator conversion means for converting a difference between the calculated actual driving force and the selected desired and the operator desire estimated value to an evaluation indicator;

running characteristic discriminating means for discriminating based on the evaluation indicator which of a first running characteristic and a second running characteristic, that are different in driving force response, the vehicle operator wants; and driving force controlling means for controlling a driving force of the vehicle through at least one of an output of the engine and a gear ratio in accordance with the discriminated running characteristic.

10. A system according to claim 9, wherein the driving force controlling means includes feedback-controls such that the driving force converges the desired driving force.

11. A method of controlling an automatic transmission of a vehicle having an input shaft connected to an internal combustion engine mounted on the vehicle and an output shaft connected to driven wheels of the vehicle, the transmission transmitting output torque generated by the engine and inputted through the input shaft to the driven wheels through the output shaft, wherein the improvement comprises the steps of:

detecting operating conditions of the engine and the vehicle including at least a vehicle speed and a throttle opening;

calculating a running resistance acting on the vehicle;

calculating a driving force generated by the vehicle using a model representing a difference between ideal vehicle response and actual vehicle response;

estimating a slope of a road on which the vehicle travels based on at least the calculated running resistance and the driving force;

comparing the estimated slope with a predetermined value and discriminating a running state of the vehicle;

determining a slope-specific driving force based on at least the estimated slope of the road, comparing the determined slope-specific driving force with a prescribed value and selecting one of desired driving forces prepared separately for condition of the road determining the running state of the vehicle based on a result comparison;

calculating a maximum driving force to be generated by the vehicle at a current gear ratio and an engine speed obtained if an accelerator pedal that is not mechanically connected to the throttle, is assumed to be fully depressed to calculate a driving force difference from the calculated driving force and for determining a gear ratio such that the driving force difference becomes the selected desired driving force for the discriminated running state; and operating the transmission in response to the determined gear ratio, wherein the gear ratio determining step corrects the calculated driving force difference based on at least one of the estimated slope and the detected vehicle speed.

12. A method according to claim 11, wherein the gear ratio determining step corrects the calculated driving force difference based on at least the throttle opening and a change in the throttle opening.

13. A method according to claim 11, wherein the gear ratio determining step determines the gear ratio based on the calculated driving force difference and the running resistance when it is discriminated that the vehicle is hill-descending.

14. A method according to claim 13, wherein the gear ratio determining step determines the gear ratio such that the calculated driving force difference becomes equal to the calculated running resistance, when it is discriminated that the vehicle is hill-descending.

15. A method according to claim 13, wherein the gear ratio determining step determines the gear ratio such that a difference between the calculated driving force difference and the calculated running resistance becomes a predetermined value, when it is discriminated that the vehicle is hill-descending.

16. A method according to claim 11, wherein the slope estimating step includes the steps of, detecting the vehicle acceleration of the vehicle;

changing a time constant of data processing necessary for the estimation of the slope in response to the detected vehicle acceleration.

17. A method according to claim 11, wherein the slope estimating step includes the step of;

estimating a braking force based on the estimated slope before braking and the estimated slope during braking when a brake is operated;

and holds the estimated slope based on the estimated braking force.

18. A method according to claim 11, wherein the slope estimating step includes the step of;

estimating a cornering resistance based on a turning force of the vehicle;

and corrects the estimated slope based on the estimated cornering resistance.

19. A method of controlling an automatic transmission of a vehicle having an input shaft connected to an internal combustion engine mounted on the vehicle and an output shaft connected to driven wheels of the vehicle, the transmission transmitting output torque generated by the engine and inputted through the input shaft to the driven wheels through the output shaft, wherein the improvement comprises the steps of:

detecting operating conditions of the engine and the vehicle including at least a vehicle speed and a throttle opening;

calculating an actual driving force generated by the vehicle based on at least the detected throttle opening using a model representing a difference between ideal vehicle response and actual vehicle response;

estimating a value desired by a vehicle operator based on at least the detected throttle opening using a model describing the vehicle operator desire based on a position of an accelerator;

estimating a slope of a road on which the vehicle travels based on at least a running resistance acting on the vehicle and the calculated actual driving force;

determining a slope-specific driving force based on at least the estimated slope of the road, comparing the determined slope-specific driving force with a prescribed value and selecting one of desired driving forces prepared separately for condition of the road based on a result comparison;

converting a difference between the calculated actual driving force and the selected desired and the operator desire estimated value to an evaluation indicator;

discriminating based on the evaluation indicator which of a first running characteristic and a second running characteristic, that are different in driving force response, the vehicle operator wants; and controlling a driving force of the vehicle through at least one of an output of the engine and a gear ratio in accordance with the discriminated running characteristic.

20. A method according to claim 19, wherein the driving force controlling step includes the step of:

performing feedback-controls feedback-control such that the driving force converges the desired driving force.

* * * * *